US012632704B2

(12) United States Patent
Lee

(10) Patent No.: US 12,632,704 B2
(45) Date of Patent: May 19, 2026

(54) NEURAL PROCESSING UNIT INCLUDING POST-PROCESSING UNIT

(71) Applicant: DEEPX CO., LTD., Seongnam si (KR)

(72) Inventor: Ho Chul Lee, Gwangmyeong-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/822,390

(22) Filed: Sep. 2, 2024

(65) Prior Publication Data

US 2025/0363335 A1 Nov. 27, 2025

(30) Foreign Application Priority Data

May 23, 2024 (KR) ........................ 10-2024-0067309

(51) Int. Cl.
*G06N 3/0464* (2023.01)
(52) U.S. Cl.
CPC .................................. *G06N 3/0464* (2023.01)
(58) Field of Classification Search
None
See application file for complete search history.

(56) References Cited

U.S. PATENT DOCUMENTS

| | | | | |
|---|---|---|---|---|
| 10,839,245 B1* | 11/2020 | Dhillon | .................. | G06F 18/217 |
| 11,775,814 B1* | 10/2023 | Anand | .................... | G06F 16/53 |
| | | | | 706/25 |
| 2005/0169378 A1* | 8/2005 | Kim | ....................... | H04N 19/57 |
| | | | | 375/E7.102 |

| | | | | |
|---|---|---|---|---|
| 2018/0365532 A1* | 12/2018 | Molchanov | .......... | G06V 40/162 |
| 2019/0012551 A1* | 1/2019 | Fung | ................ | G08G 1/096708 |
| 2019/0304171 A1* | 10/2019 | Li | ............................ | G06T 15/30 |
| 2020/0349464 A1* | 11/2020 | Lin | ......................... | G06N 3/084 |
| 2020/0410397 A1* | 12/2020 | Chae | ....................... | G06F 16/55 |
| 2021/0081797 A1* | 3/2021 | Rodyushkin | .......... | G06F 18/214 |
| 2021/0158132 A1* | 5/2021 | Huynh | ..................... | G06N 3/04 |
| 2023/0020026 A1* | 1/2023 | Chakraborty | ........ | G06N 3/0464 |

(Continued)

FOREIGN PATENT DOCUMENTS

| | | |
|---|---|---|
| CN | 113255898 A | 8/2021 |
| KR | 10-2022-0068357 A | 5/2022 |
| KR | 10-2022-0130513 A | 9/2022 |

(Continued)

OTHER PUBLICATIONS

Nakahara et al., "An Object Detector based on Multiscale Sliding Window Search using a Fully Pipelined Binarized CNN on an FPGA", IEEE 2017 International Conference on Field Programmable Technology (Year: 2017).*

(Continued)

*Primary Examiner* — Usmaan Saeed
*Assistant Examiner* — Beatriz Ramirez Bravo

(57) ABSTRACT

According to one example of the present disclosure, the neural processing unit may comprise a processing element array configured to perform operations of a neural network model and a post-processing unit configured to process data output from the processing element array. The post-processing unit includes a first computation circuit that extracts a subset of classes for each bounding box by comparing class scores of classes and a second computation circuit configured to extract one or more bounding boxes by comparing a class confidence score of each bounding box with a threshold confidence score.

13 Claims, 27 Drawing Sheets

REF BOX

Non-Max
Suppression

(56)                     References Cited

U.S. PATENT DOCUMENTS

2024/0329933 A1 *  10/2024  Wang ..................... G06N 3/063
2024/0331288 A1 *  10/2024  Appia ....................... G06T 7/73

FOREIGN PATENT DOCUMENTS

KR     10-2022-0145143  A     10/2022
KR     10-2023-0060356  A      5/2023
KR     10-2023-0134690  A      9/2023
WO     WO-2015177268  A1 *  11/2015   ......... G06K 9/00127

OTHER PUBLICATIONS

Real et al., "YouTube-Bounding Boxes: A Large High-Precision
Human-Annotated Data Set for Object Detection in Video", Pro-
ceedings of the IEEE Conference on Computer Vision and Pattern
Recognition (CVPR), 2017, pp. 5296-5305 (Year: 2017).*
Notice of Allowance of the corresponding KR application No.
10-2024-0067309 mailed on Nov. 4, 2025.

* cited by examiner

Convolution   Pooling   Convolution   Pooling   Fully     Fully     Output
                                                Connected Connected Predictions Feature Map Channels

| Operation | Energy(pj) | Relative Energy Cost |
|---|---|---|
| 8b Add | 0.03 | |
| 16b Add | 0.05 | |
| 32b Add | 0.1 | |
| 16b FP Add | 0.4 | |
| 32b FP Add | 0.9 | |
| 8b Mult | 0.2 | |
| 32b Mult | 3.1 | |
| 16b FP Mult | 1.1 | |
| 32b FP Mult | 3.7 | |
| 32b SRAM Read | 5 | |
| 32b DRAM Read | 640 | |

1   10   $10^2$   $10^3$   $10^4$

600

S100

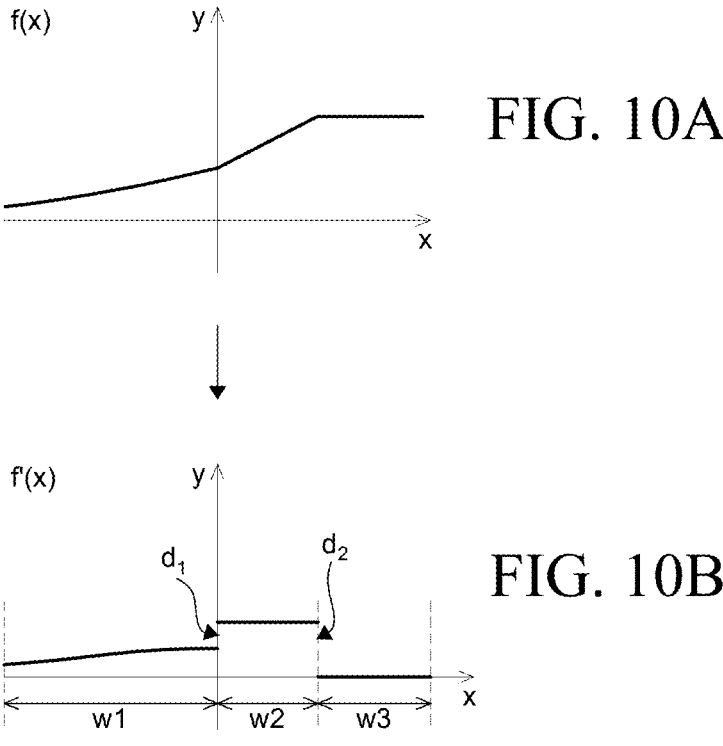
FIG. 10A
FIG. 10B
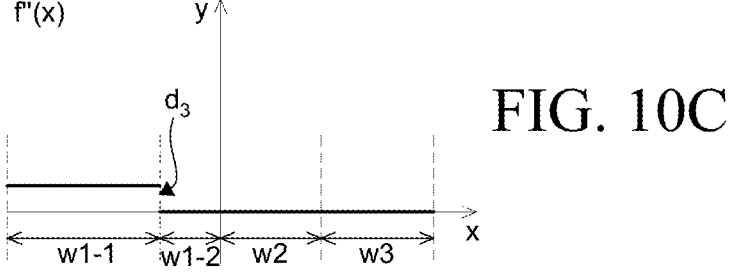
FIG. 10C $$f(x)=\begin{cases} x & (x>0) \\ \alpha(e^x-1) & (x\leq 0) \end{cases}$$

FIG. 19

$$f(x) = \begin{cases} 0 & (x \leq 0) \\ x & (x \geq 0) \\ x \cdot (x+3)/6 & (\text{otherwise}) \end{cases}$$

FIG. 20

Input Layer ∈ R¹          Hidden Layer ∈ R¹⁵          Output Layer ∈ R¹

REF BOX

Non-Max
Suppression

NEURAL PROCESSING UNIT INCLUDING POST-PROCESSING UNIT

CROSS-REFERENCE TO RELATED APPLICATION

This application claims the priority of Republic of Korea Patent Application No. 10-2024-0067309, filed on May 23, 2024 in the Korean Intellectual Property Office, the disclosure of which is incorporated herein by reference.

BACKGROUND OF THE DISCLOSURE

Humans have the intelligence to recognize, classify, infer, predict, control/decision making, and the like. Artificial intelligence (AI) is the artificial imitation of human intelligence.

The human brain is made up of tons of nerve cells called neurons. Each neuron is connected to hundreds to thousands of other neurons through connections called synapses. In order to mimic human intelligence, the operation of biological neurons and the connections between neurons are modeled in a neural network (NN) model. In other words, a neural network is a system of nodes connected in a layer structure that mimics neurons.

SUMMARY OF THE DISCLOSURE

Embodiments relate to a neural processing circuit including a processing element array circuit, a post-processing circuit and a subsequent circuit. The processing element array circuit generates data output by performing convolution operations of a neural network model. The post-processing circuit is coupled to the processing element array circuit to receive the data output and extracts a subset of the data output. The subsequent circuit is coupled to the post-processing circuit, and selectively stores or performs operations on the extracted subset of the data output.

In one or more embodiments, the data output includes, for each bounding box in a region of an image, class scores indicative of probability that classes of objects being presenting in each bounding box.

In one or more embodiments, the post-processing circuit includes a first computation circuit that selects one or more classes for each bounding box as the subset of the data output by comparing class scores of classes for each bounding box.

In one or more embodiments, the post-processing circuit further includes a second computation circuit that extracts one or more bounding boxes by comparing a class confidence score of each bounding box with a threshold confidence score. The class confidence score represents probability that an object of a class is present in each bounding box. The class confidence score is derived from the object presence confidence score and the class scores.

In one or more embodiments, the second computation circuit computes the class confidence score as a product of the object presence confidence score and a class score with the subset of classes extracted by the first computation circuit.

In one or more embodiments, the post-processing circuit further includes an internal memory coupled to the first computing circuit and the second computation circuit. The internal memory stores the subset of classes for each bounding box extracted by the first computation circuit, and stores data of the one or more bounding boxes extracted by the second computation circuit.

In one or more embodiments, the post-processing circuit further includes an internal processing circuit that performs a non-maximum suppression (NMS) operation on the one or more bounding boxes extracted by the second computation circuit.

In one or more embodiments, the internal processing circuit performs the NMS operation during a period in which the processing element array performs the convolution operations.

In one or more embodiments, the internal processing circuit starts the NMS operation for a subsequent image subsequent to the image at a time that is later of (i) a completion time of the NMS operation for the image data and (ii) a completion time of the convolution operations on the image by the processing element array circuit.

In one or more embodiments, the data output further includes coordinate data of each bounding box.

In one or more embodiments, the post-processing circuit further includes an internal memory that stores the subset of classes for each bounding box extracted by the first computation circuit.

In one or more embodiments, the first computation circuit performs the comparison of the class scores during a period in which the processing element array circuit performs the convolution operations.

In one or more embodiments, the neural processing circuit further includes one or more processors, and memory. The memory stores instructions of a compiler. The instructions when executed by the one or more processors cause adding a class-argmax layer to generate the neural network model. The extracting of the subset of classes by the first computation circuit corresponds to operations of the class-argmax layer.

BRIEF DESCRIPTION OF THE DRAWINGS

FIGS. 10A through 10C are graphs illustrating one example of segmenting an activation function into linear and nonlinear segments using slope change data among segment data in an activation function programming method, according to one example of the present disclosure.

FIGS. 19 and 20 are graphs illustrating an ELU activation function and a Hardswish activation function.

DETAILED DESCRIPTION OF THE EMBODIMENT

Figure 1:
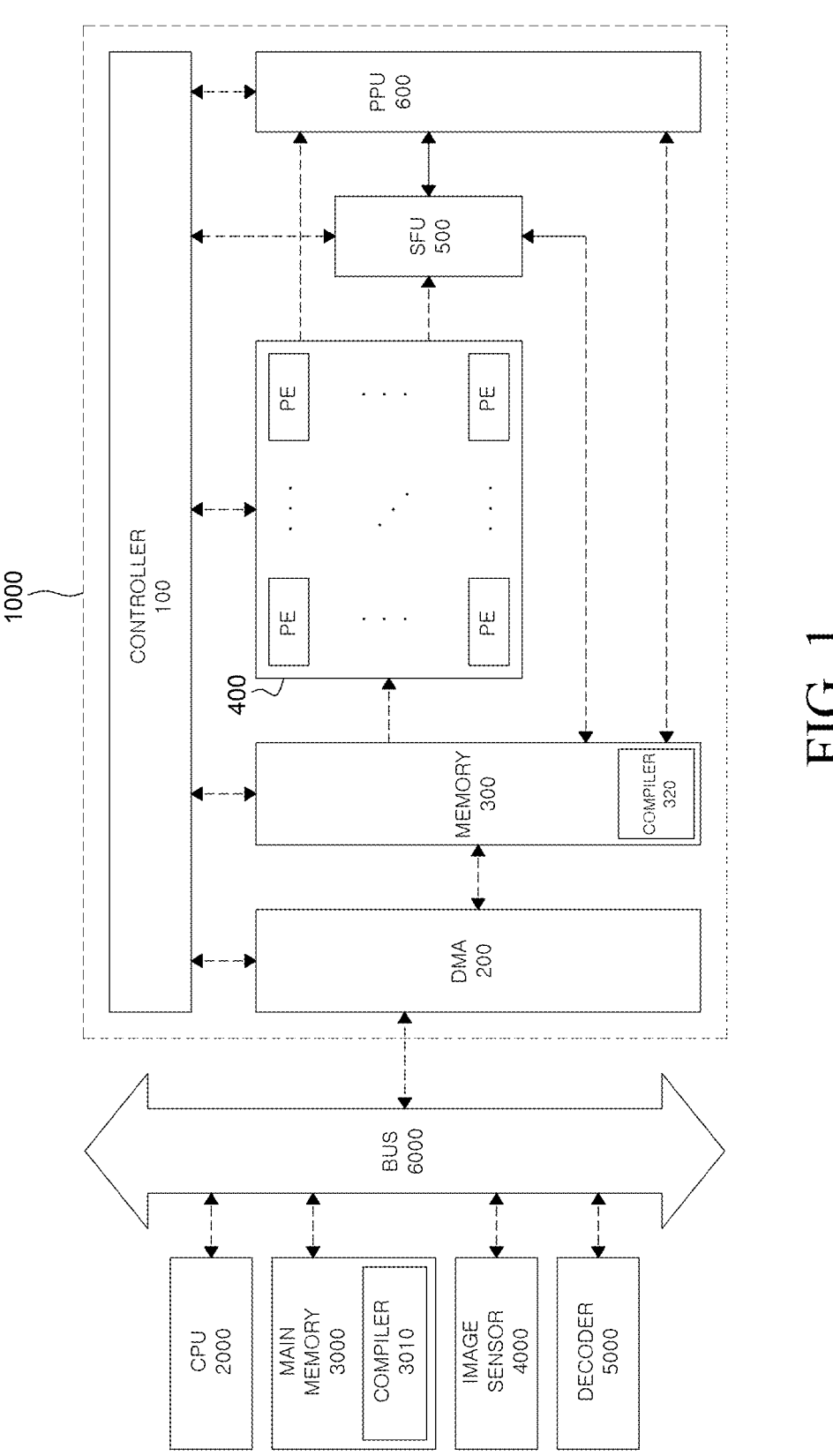
FIG. 1 is a schematic diagram illustrating a neural processing unit including a post-processing unit according to one example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms. Examples according to the concept of the present should not be construed as being limited to the examples described in the present specification or application.

Examples according to the concept of the present disclosure may apply various changes. The present disclosure may take many forms. Accordingly, specific examples are illustrated in the drawings and described in detail in the present disclosure. However, this is not intended to limit the examples according to the concepts of the present disclosure to a specific disclosure form. Therefore, it should be understood that all changes, equivalents or substitutes included in the spirit and scope of the present disclosure are included in the present disclosure.

Terms such as first and/or second may be used to describe various components. However, the present disclosure should not be limited by the above terms. These terms are only used for the purpose of distinguishing one component from another. For example, without departing from the scope of rights according to the concept of the present disclosure, a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween. Other expressions describing the relationship between elements, such as "between" and "immediately between" or "adjacent to" and "directly adjacent to", etc., should be interpreted similarly.

In the present disclosure, expressions such as "A or B", "at least one of A or/and B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used herein, expressions such as "first", "second", "first or second" may modify various elements, regardless of order and/or importance. Said expressions are used only to distinguish one element from other elements, and does not limit the elements. For example, the first user apparatus And the second user device may represent different user device regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure. Singular expressions include plural expressions unless the context clearly dictates otherwise. In this specification, terms such as "comprise" or "having" are intended to indicate that the described feature, number, step, operation, component, part, or combination thereof is present. Accordingly, it should be understood that the presence or addition of one or more other features, numbers, steps, operations, components, parts, or combinations thereof is not precluded.

Unless defined otherwise, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the related art. Unless explicitly defined in this disclosure, it is not to be construed in an ideal or overly formal sense.

Each feature of the various examples of the present disclosure may be partially or wholly combined or combined with each other. Various examples of the present disclosure are technically capable of various interlocking and driving as can be fully understood by those skilled in the art. Each of the examples of the present disclosure may be implemented independently of each other or may be implemented together in an association relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Definitions of Terms

To facilitate understanding of the present disclosure, the following is a brief summary of terms used herein.

NPU: Abbreviation for neural processing unit, which may refer to a processor specialized for computing a neural network model independent of a CPU.

NN: Abbreviation for neural network, a network of nodes connected in a layer structure, mimicking the way neurons in the human brain are connected through synapses, to mimic human intelligence.

Information of a neural network: The information may include the structure of the network, information about the number of layers, information about the connection relationship of each layer, information about the parameters of each layer, information about the computational processing method, information about the activation function, the data type of the parameters of each layer (e.g., floating-point or integer), and the bitwidth of each parameter.

DNN: Abbreviation for deep neural network, which can refer to an increase in the number of hidden layers of a neural network to achieve higher artificial intelligence.

CNN: Abbreviation for convolutional neural network, a neural network that functions similarly to the visual cortex of the human brain in processing images. Convolutional neural networks are known to be well-suited for image processing and are known for their ability to extract features from input data and identify patterns in the features.

Transformer: The transformer neural network is a DNN based on attention techniques. It utilizes many matrix multiplication operations. A transformer can take an input value and parameters such as query (Q), key (K), and value (V) to obtain an output value, attentions (Q, K, V). Based on the output value (i.e., the attentions (Q, K, V)), the transformer can process various inference operations.

Kernel: Refers to the weights of the N×M matrix of convolutions. Each layer of the neural network model has a plurality of kernels, and the number of kernels may be referred to as the number of channels, the number of filters, and the like.

Neural Network (NN) models are categorized according to the number of layers into 'single-layer neural networks' and 'multi-layer neural networks'. A typical multi-layer neural network consists of an input layer, a hidden layer, and an output layer. (1) The input layer is the layer that receives external data, and the number of neurons in the input layer is the same as the number of input variables. (2) The hidden layer is located between the input and output layers and receives signals from the input layer, extracts features, and passes them to the output layer. (3) The output layer receives signals from the hidden layer and outputs them to the outside. The input signals between neurons are multiplied by their respective weights, which have a value between 0 and 1, and then summed up. If this sum is greater than the threshold of the neuron, the neuron is activated and implemented as an output value through the activation function.

On the other hand, increasing the number of hidden layers in a neural network to achieve higher artificial intelligence is called a deep neural network (DNN). There are many types of DNNs, but convolutional neural networks (CNNs) are known to extract features from input data and identify patterns in the features. A convolutional neural network (CNN) is a network structure in which the operations between neurons in each layer are implemented as the convolution of a matrix of input signals and a matrix of weight kernels.

Convolutional neural networks are neural networks that function similarly to the visual cortex of the human brain, which processes images. Convolutional neural networks are known to be suitable for image classification, object detection and the like. Convolutional neural networks are composed of convolutional operations, activation function operations, and pooling operations processed in a specific order (e.g., FIG. 3). In a convolutional neural network, convolutional operations take up most of the computation time. Convolutional neural networks use a kernel in the form of a matrix to extract the features of each channel's image, and pooling to provide homeostasis against movement or distortion. In each channel, a feature map is obtained by the convolution of the input data and the kernel, and an activation function is applied to generate an activation map for that channel. Pooling can then be applied. The layer that finally classifies the pattern is located at the end of the convolutional neural network and can be exemplified by the fully connected layer. In the computational processing of convolutional neural networks, most of the operations are performed via convolutional or matrix multiplication.

However, for the efficiency and accuracy of neural network model operations related to image classification and object detection, post-processing operations such as additional filtering and deduplication of the output parameters (e.g., feature maps) may be performed.

In this case, the post-processing operations described above may be performed on a central processing unit (CPU) external to the neural processing unit and the data subsequently processed by the CPU may be stored in a memory external to the neural processing unit.

As described above, a bus is used to input output parameters (e.g., feature maps) to a CPU external to the neural processing unit, and it is recognized by the inventor of the present disclosure that delivering the output parameters over the bus may cause delays in data transmission.

The memory external to the neural processing unit comprises a plurality of memory cells, each of which has a unique memory address. Whenever the neural processing unit recalls feature maps or weights stored in the main memory, or recalls other parameters, a latency of several clocks may be consumed to access the main memory cell corresponding to the address in the memory. These latencies may include column address strobe (CAS) latency and row address strobe (RAS) latency. Hence, the time and power consumed to read the necessary data and parameters (e.g., weights, feature maps, or kernels) from a memory external to the neural processing unit to the neural processing unit is significant.

FIG. 1 is a schematic diagram illustrating a neural processing unit 1000 including a post-processing unit 600, according to one example of the present disclosure. The neural processing unit 1000 may include a post-processing unit 600, and the neural processing unit 1000 is coupled to a plurality of peripheral devices. Accordingly, the neural processing unit and the plurality of peripherals may be referred to as a system. At least some of the element(s) of the system may be formed as a system on a chip (SoC).

Referring to FIG. 1, a neural processing unit 1000 may be configured to perform various neural network inference functions in communication with a processor, a CPU 1000, a main memory 3000, an image sensor 4000, and a decoder 5000. Each of the neural processing unit 1000, processor 2000, main memory 3000, image sensor 4000, or decoder 5000 may be formed as an independent circuit, but is not limited thereto. The neural processing unit 1000 may comprise circuitry formed on the same semiconductor die as the processor 2000. Further, the neural processing unit 1000, the processor 2000, and the main memory 3000 may comprise circuitry formed on the same semiconductor die. Also, the neural processing unit 1000 may comprise semiconductor dies connected to the processor 2000 by chiplet technology. When chiplet technology is applied, it may further include an interposer. Alternatively, the processor 2000, and the main memory 3000 may comprise a plurality of semiconductor dies connected by chiplet technology.

Each of the elements described above may be categorized by its operation function, and each of the elements may be implemented as a circuit board, a silicon substrate, a resistor element, a transistor, and the like. Thus, each element may be a semiconductor circuit with numerous transistors connected thereto, some of which may be difficult to identify and distinguish with the naked eye, and may be identified only by operation. Accordingly, each of the elements of FIG. 1 may be referred to as a circuit unit.

Each of the CPU 2000, main memory 3000, image sensor 4000, and decoder 5000 described above may communicate via a bus 6000 to send and receive data to and from the neural processing unit 1000. According to one example of the present disclosure, the bus 6000 may be an advanced extensible interface (AXI) bus. However, without limitation, the neural processing unit 1000 may also be configured to be directly coupled to at least one of the elements described above.

The neural processing unit 1000 may be defined as a processor specialized for the operation of a neural network model. In particular, the neural processing unit 1000 may be specialized for matrix operations or convolutional operations, which account for the majority of the computation in the neural network model.

The neural processing unit 1000 may include a controller 100, a direct memory access (DMA) 200, a memory 300, a processing elements array 400, a special function unit (SFU) 500, and a post-processing unit (PPU) 600.

The elements of the neural processing unit 1000 may be distinguished by their operation functions, and each element may be formed utilizing circuit elements such as a resistor and a transistor. Thus, each element may be a semiconductor circuit with numerous connected transistors.

The controller 100 may be configured to control operations associated with computing the neural network model by each of the DMA 200, the memory 300, the processing elements array 400, the SFU 500, and the post-processing unit (PPU) 600. The controller 100 may be directly coupled or indirectly coupled to each of the DMA 200, memory 300, processing elements array 400, SFU 500, and post-processing unit (PPU) 600 to communicate with each other. For example, the controller 100 may allocate the capacity of each of the parameters in the memory 300 based on the capacity of the memory 300. The controller 100 may be configured to control the neural processing unit 1000 based on machine code (e.g., binary code) of a compiled neural network model. For example, a compiler 320 may generate machine code that determines, based on hardware characteristics of the neural processing unit 1000 (e.g., number of processing elements, amount of memory, functions provided by a special function unit, presence of a post-processing unit, and the like), a read/write sequence of data of the neural network model, a processing sequence of layers of the neural network, an operation sequence of convolutional multiplication, an operation sequence of matrix multiplication, and a read and write operation sequence of data of the DMA. Accordingly, the controller 100 may control the neural processing unit 1000 based on the machine code.

The controller 100 may obtain schedule information that schedules an order of operations of the neural network model to be performed by the neural processing unit 1000 based on the directed acyclic graph (DAG) of the neural network model compiled by compiler 3010 executed by CPU 20000. The compiler 3010 may determine an operation schedule that can accelerate the operation of the neural network model by determining the number of processing elements (PEs) of the neural processing unit 1000, the size of the memory 300, the size of the parameters of each layer of the neural network model, and the like. According to the computation schedule, the controller 100 may be configured to control the required number of processing elements PEs for each computation step and to control the read and write operations of the required parameters in the memory 300 for each computation step. The compiler 3010 may efficiently schedule the operations according to the information of the hardware structure and performance of the neural processing unit 1000. The compiler 3010 may determine data locality based on the order of the layers of the neural network, the order of the operations of the unit convolution and/or matrix multiplication, and generate compiled machine code based on the order of the data required to compute the neural network model.

In some examples, the neural processing unit 1000 may be configured to include an embedded compiler 320. The embedded compiler 320 may perform some operations in addition to or in place of external compiler 3010. According to the configurations described above, compiler 3010 and/or compiler 320 of the neural processing unit 1000 may generate machine code upon input of files in the form of various AI software frameworks. For example, AI software frameworks may include TensorFlow, PyTorch, Keras, XGBoost, mxnet, DARKNET, ONNX, and the like.

The DMA 200 may be configured to allow the neural processing unit 1000 to directly access, read and/or write to the main memory 3000 of the neural processing unit 1000. The neural processing unit 1000 may read various data associated with the neural network model from the main memory 3000 via the DMA 200. The main memory 3000 may be embedded in a system-on-chip (SoC) or may be configured as a separate memory device.

The memory 300 may be located in an on-chip region of the neural processing unit 1000, and may perform caching or storing of data processed in the on-chip region. The memory 300 may also be referred to as cache memory. The memory 300 may read and store at least some of the data associated with computing the neural network model from the main memory 3000. The memory 300 may be configured to store all or part of the neural network model according to the memory capacity settings for each parameter and the data size for each layer of the neural network model. Representative parameters of data processed in the neural network model may include, among other data, attention parameters, KV cache, an activation map, an input feature map, an output feature map, and weights. Specifically, the memory 300 may read and store parameters corresponding to input data from the main memory 3000. Additionally, the memory 300 may read and store parameters corresponding to output data from the processing element array 400.

The memory 300 may be embodied as one or more of read-only memory (ROM), static random access memory (SRAM), dynamic random access memory (DRAM), Resistive random access memory (RAM), Magneto-resistive RAM, Phase-change RAM, Ferroelectric RAM, Flash Memory, high-bandwidth memory (HBM), and the like. According to one example of the present disclosure, the memory 300 may be embodied as SRAM, which is advantageous in terms of computational processing speed. Further, the memory 300 may be organized into at least one memory unit (e.g., a bank). The memory 300 may comprise homogeneous memory or heterogeneous memory.

The data stored in the memory unit of the memory 300 is not static and may change dynamically. By varying the memory allocation of the memory 300 to different types of parameters and data, the utilization rate of the memory 300 may be increased. Further, the size of data for each type of parameter stored by the memory 300 may vary for each computational step.

The processing element array 400 is a hardware circuit that performs multiplication and accumulation (MAC)

operations. The processing element array 400 may be configured to receive, as input data, an input feature map and/or a kernel corresponding to a layer of the neural network, part of the layer of the neural network or multiple layers of the neural network. A processing element (PE) in the processing element array 400 may be configured to perform functions such as addition, multiplication, accumulation, and the like to perform operations as defined by the neural network model. The PE may include, among other components, a multiply and accumulate (MAC) operator, and an arithmetic logic unit (ALU) operator.

In one example, a PE may take an input feature map or a part of the input feature map, perform convolution operations using the kernel and output an output feature map or a part of the output feature map. The processing element array 400 or the processing element PE may also be referred to as an artificial intelligence (AI) computing unit. In another example, the PE may perform a general matrix multiply (GEMM) operation or a matrix multiply operation on the input feature map using weights to output an output feature map or a part of the output feature map. More specifically, the PE may multiply the input feature map in the form of a matrix with a weight matrix, and then add a bias to the matrix to output an output feature map or a part of the output feature map in the form of a matrix. In the neural processing unit, the matrix multiplication may be performed at a high speed by parallel processing, thereby enabling efficient processing of the matrix multiplication operation.

The PE may include circuitry designed to handle only integer type parameters as input. In such a case, the input parameters of the PE may be converted to integers of a specific bitwidth and be stored in the memory 300. Such PE may reduce the power consumption compared to PEs that support floating point and may be easier to implement as an on-device component.

The SFU 500 may process a number of activation functions for imparting nonlinearity to the output feature map. The activation functions processed by the SFU 500 may include, but are not limited to, SiLU functions, Softmax functions, sigmoid functions, hyperbolic tangent (tanh) functions, ReLU functions, Leaky ReLU functions, Maxout functions, or ELU functions that result in nonlinear outputs with respect to inputs. It may be technically difficult to support all activation functions in the neural processing unit 1000. Therefore, the neural processing unit 1000 may also approximate various activation functions through a piecewise linear function approximation algorithm and piecewise linear function processing circuitry. These activation functions can be optionally applied after the MAC operation. The result of an operation applied with an activation function is referred to as an activation map.

In some embodiments, the SFU 500 may be configured to include a floating-point multiplier circuit for performing decimal point operations. In other embodiments, the SFU 500 may be configured to communicate with the PEs and may include circuitry designed to receive integer-type parameters from the PEs. In such a case, the SFU 500 may be further configured to include an inverse quantizer circuit configured to convert the integer-type parameter to a floating point-type parameter. The SFU 500 may be configured to process an activation function operation with the floating-point type parameters. Further, the SFU 500 may be configured to further include a quantization circuit configured to convert a parameter of a floating-point type at the end of the activation function operation to a parameter of an integer type. According to the above-described configuration, the SFU 500 may be configured to process the floating-point operation by de-quantizing the integer parameter when a floating-point operation is required, and to re-quantize the result. In other words, a neural processing unit according to one example of the present disclosure may include a processing element circuit configured to process an integer type parameter and a special function circuit unit pipelined thereto, where the special function circuit unit includes a quantization circuit and a de-quantization circuit and may be configured to process an activation function operation with a floating-point type parameter. According to the above-described configuration, the SFU 500 effectively communicates with the PEs that support only integer parameters, and may directly convert and process the integer parameters without support from circuitry outside the neural processing unit.

In some examples, the post-processing unit 600 may be configured to process a number of activation functions for imparting nonlinearity to the output feature map.

Figure 2:
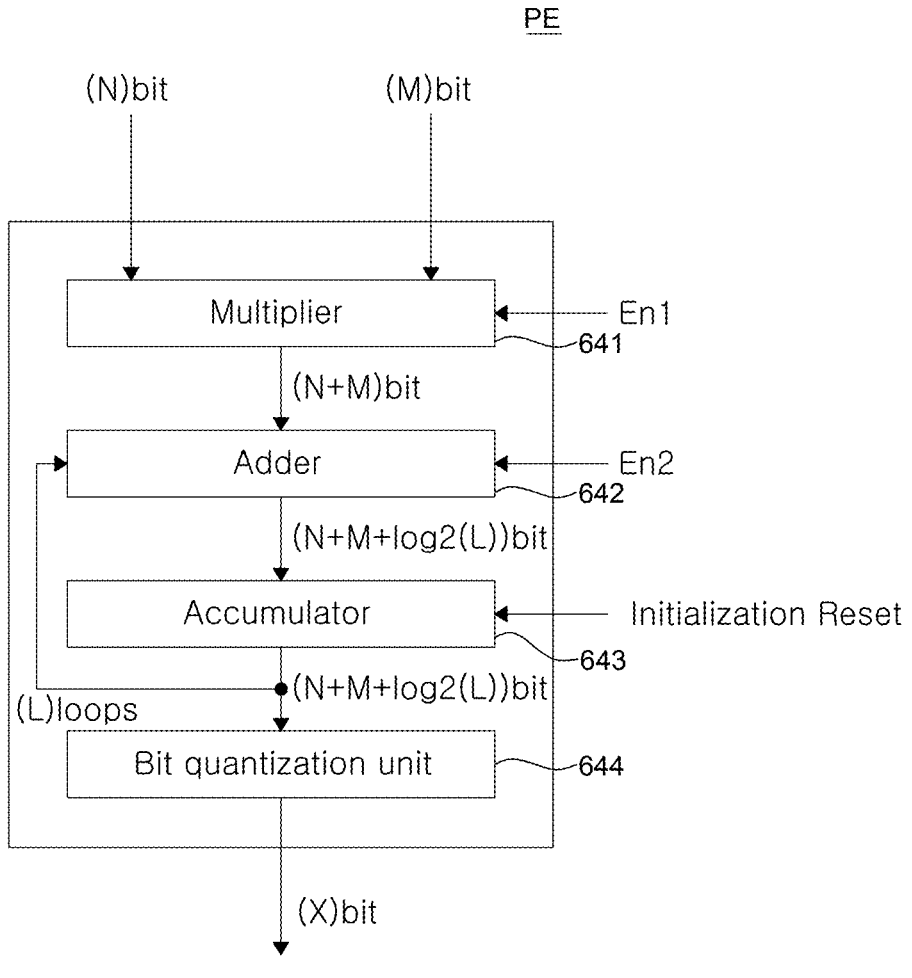
FIG. 2 is a schematic diagram illustrating one processing element that may be applicable to one example of the present disclosure.

FIG. 2 is a schematic diagram illustrating the PE according to one embodiment. Referring to FIG. 2, the PE may include, among other components, a multiplier 641, an adder 642, an accumulator 643, and a bit quantization unit 644. Various modifications may be made to PE of FIG. 2 to account for the computational characteristics of a target neural network model.

The multiplier 641 is a circuit that multiplies the input (N)-bit data and the (M)-bit data. The result of the multiplier 641 is output as (N+M)-bit data, where N and M are integers greater than zero. The first input that receives the (N)-bit data that changes dynamically whereas the second input that receives the (M)-bit data receive a parameter that remains relatively constant. For example, a set of weight parameters trained in a neural network model may be constant while the PE is processing a same layer of the neural network while input parameters such as activation parameters, feature map parameters, attention parameters, KV cache parameter computed with the set of weight parameters may vary frequently relative to the set of weight parameters.

A parameter that is variable means that the parameter is updated each time incoming input data to the neural network is updated. For example, the node data of each layer may be a MAC operation value reflecting the weight data of a neural network model where the node data of each layer in the neural network changes whenever the input video changes every frame. A parameter that is static means that the parameter is maintained regardless of the update of the incoming input data. For example, the weight data may remain constant if the neural network model is used to infer object detection of the video data.

The variable parameters fed to the first input may be node data of a layer of the neural network model. The node data of the neural network model may be one of input data of the input layer, accumulated values of the hidden layer, and accumulated values of the output layer. The constant parameters fed to the second input may be weight data of a connection network of the neural network model.

The controller 100 may improve memory reuse by taking into account the nature of the constant parameters. The variable parameters are computational values of each layer, and the controller 100 may identify reusable variable parameters based on the machine code of the compiled neural network model, and control the memory 300 to reuse the memory.

Figure 4:
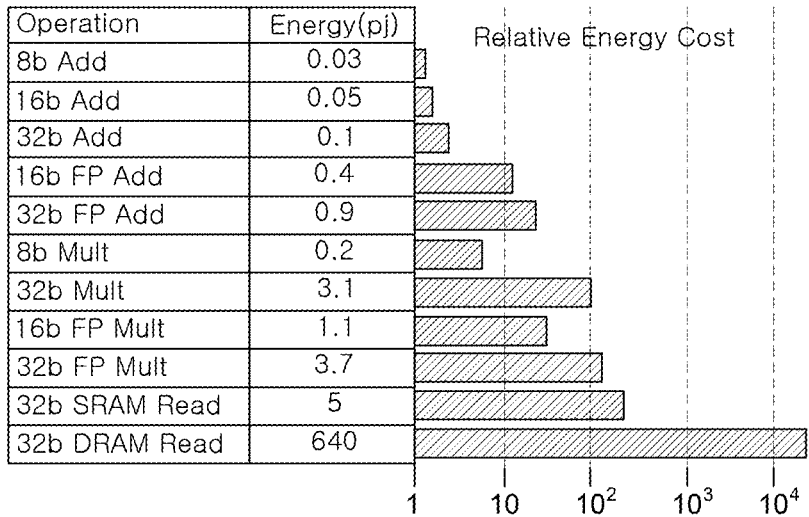
FIG. 4 is a schematic diagram describing energy consumption per unit operation of a neural processing unit, according to one example of the present disclosure.

The constant parameters are the weight data of each connection network, and the controller 100 may recognize the constant parameters of the repeatedly used connection networks based on the structure data of the neural network model or the neural network data locality information, and may control the memory 300 to reuse the parameters stored in the memory 300. Reusing the parameters means that the parameters stored in the memory 300 are not deleted, or copied or moved to the main memory 3000, but are reused in the subsequent operation. According to the above-described configuration, it beneficially reduces power consumption according to the operation of the main memory 3000 as shown in FIG. 4. Furthermore, it has the effect of eliminating the delay time that occurs when the neural processing unit 1000 transmits data to and from the main memory 3000. The controller 100 may have information on reusable variable parameters and reusable constant parameters based on the machine code of the compiled neural network model. Accordingly, the controller 100 may be configured to control the memory 300 to reuse the parameters stored in the memory.

The processing element may constrain the operation of the multiplier 641 such that when a zero is input at an input of one of the first input and the second input of the multiplier 641, the multiplier 641 may not perform an operation because the processing element knows that the result of the operation will be zero even if the operation is not performed. For example, when a zero is provided to an input of one of the first input and the second input of the multiplier 641, the multiplier 641 may be configured to operate in a zero-skipping manner.

For zero-skipping, each of the PEs included in the PE array 400 may be enabled or disabled, respectively. The controller 100 may be configured to provide an enable or disable signal to each of the processing elements PEs on a clock-by-clock basis to each of the processing elements PEs. When the PE is disabled, the multiplier 641 may be configured to deactivate according to a level of the first enable signal En1. Accordingly, the power consumed by the operation of the multiplier 641 may be reduced. For example, information about the power consumption of the multiplier may be provided with reference to FIG. 4.

For zero skipping, each of the processing elements PEs included in the processing element array 400 may be enabled or disabled, respectively. The control unit 100 may be configured to provide an enable or disable signal to each of the processing elements PEs on a clock-by-clock basis to each of the processing elements PEs. When the PE is deactivated, the adder 642 may be configured to deactivate according to a level of the second enable signal En2. Accordingly, the power consumed by the operation of the adder 642 may be reduced. For example, information on power consumption of the adder may be provided with reference to FIG. 4. In some examples, each PE may be designed to receive a respective control signal from the control section 100 for controlling (i.e., enabling or disabling) the zero-skipping operation.

In some examples, each multiplier 641 of each PE may receive a respective control signal from the controller 100 for controlling zero-skipping operations. According to the configurations described above, the power consumption of the multipliers can be reduced by zero-skipping.

In some examples, each adder 642 of each PE can be designed to receive a respective control signal from the control unit 100 for controlling the zero-skipping operation. According to the configurations described above, the power consumption of the adders can be reduced by zero-skipping.

In some examples, each of the multiplier 641 and adder 642 of each PE may be designed to simultaneously receive a respective control signal for controlling the zero-skipping operation from the controller 100. According to the configurations described above, the power consumption of the multipliers and adders may be reduced by zero-skipping.

In some examples, the weights are constant parameters generated by training, and the machine code from which the neural network model comprising the weights has been compiled may be programmed to input respective control signals for controlling the zero-skipping operation to each of the PEs at which values with zero weights are input.

The number of bits of data input to the first input and the second input may be determined according to the quantization of the node data and the weight data of the respective layers of the neural network model. For example, the node data of the first layer may be quantized to 5 bits and the weight data of the first layer may be quantized to 7 bits. In such a case, the first input may be configured to receive 5-bit data and the second input may be configured to receive 7-bit data, i.e., the number of bits of data input to each input may be different.

The PE may be configured to receive quantization information of the data input to each input. The neural network data locality information may include quantization information of the input data and output data of the PE.

The neural processing unit 1000 may control when the quantized data stored in the memory 300 is fed to the inputs of the processing elements, the quantized bitwidth are converted in real time. That is, different layers may have different quantized bitwidth, and the processing elements may be configured to generate input data by converting the bitwidth in real time by receiving bitwidth information from the neural processing unit 1000 in real time as the bitwidth of the incoming data is converted.

The accumulator 643 uses the adder 642 for a number of (L) loops to accumulate the operation value of the multiplier 641 and the operation value of the accumulator 643. Thus, the number of bits of data at the output and input of the accumulator 643 may be output as (N+M+log 2(L)) bits, where L is an integer greater than zero. When the accumulator 643 finishes accumulating, the accumulator 643 may receive an initialization reset signal to initialize the data stored inside the accumulator 643 to zero. However, examples according to the present disclosure are not limited thereto. The accumulator 643 is configured to store the accumulated value even when zero-skipping is enabled in the corresponding PE. Thus, subsequent values can be accumulated even when zero skipping is enabled.

The bit quantization unit 644 may reduce the bitwidth in the data output from the accumulator 643. The bit quantization unit 644 may be controlled by the controller 100. The bitwidth of quantized data may be output as (X) bits, where X is an integer greater than zero. According to the above-described configuration, the PE array is configured to perform a MAC operation, and the PE array may quantize and output the MAC operation result. Such quantization may further reduce power consumption as the number of (L) loops increases. Reducing power consumption may also reduce heat generation in edge devices. Reducing heat generation may beneficially reduce the possibility of malfunctioning operations caused by a high temperature of the neural processing unit 1000.

The output data X bits of the bit quantization unit 644 can be the node data of the subsequent layer or the input data of a convolutional product. If the neural network model is quantized, the bit quantization unit 644 may be configured to receive quantized information from the neural network model. However, the controller 100 may also be configured to analyze the neural network model to extract the quantized information. Thus, the output data X bits may be converted to a number of quantized bits to correspond to the quantized data size. The output data X bits of the bit quantization unit 644 may be stored in the memory 300 as a quantized bitwidth.

The PE array of the neural processing unit 1000 according to one example of the present disclosure includes a multiplier 641, an adder 642, an accumulator 643, and a bit quantization unit 644. The bit quantization unit 644 may reduce the number of bits of data in (N+M+log 2(L)) bits output from the accumulator 643 by the PE array to a number of bits in (X) bits. The controller 100 may control the bit quantization unit 644 to reduce the number of bits in the output data by a predetermined number of bits from the least significant bit (LSB) to the most significant bit (MSB). Reducing the number of bits in the output data may beneficially reduce power consumption, computation, and memory usage. However, if the number of bits is reduced below a certain length, the inference accuracy of the neural network model may decrease rapidly. Therefore, the quantization level (i.e., the reduction of the number of bits in the output data) can be determined by comparing the degree of reduction in power consumption, computation, and memory usage with the degree of reduction in the inference accuracy of the neural network model. The quantization level can also be determined by setting a target inference accuracy for the neural network model and testing the accuracy of the inference with progressively lower bitwidth. The quantization level can be determined separately for each layer of the neural network model.

By adjusting the number of bits of (N) bit data and (M) bit data of the multiplier 641, and by reducing the number of bits of the operation value (X) bit by the bit quantization unit 644, the PE array may improve the MAC operation speed while reducing the power consumption, and also has the advantage of, among others, making the convolution operation of the neural network model more efficient.

Figure 3:
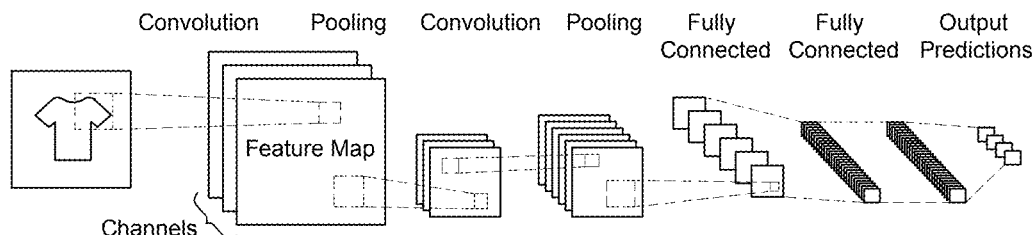
FIG. 3 is a schematic diagram illustrating a convolutional neural network relevant to the present disclosure.

FIG. 3 is a schematic diagram illustrating a convolutional neural network relevant to the present disclosure. A convolutional neural network can be a combination of one or several convolutional layers, a pooling layer, and a fully connected layer. Convolutional neural networks have a structure suitable for learning and inference from two-dimensional data and can be trained using a backpropagation algorithm.

In examples of the present disclosure, the convolutional neural network has a kernel for each channel that extracts features of the input image for the channel. The kernel may be organized as a two-dimensional matrix and performs convolutional operations, as it traverses the input data. The size of the kernel can be arbitrary, and the stride at which the kernel traverses the input data can also be arbitrary. The result of the convolution over the entire input data per kernel may be referred to as a feature map or activation map.

In the following, a kernel may include a single set of weights or multiple sets of weights. The number of kernels for each layer may be referred to as the number of channels.

Since a convolutional operation is a combination of input data and kernels, an activation function may then be applied to add nonlinearity. When an activation function is applied to a feature map that is the result of a convolutional operation, it may be referred to as an activation map.

Specifically, referring to FIG. 3, a convolutional neural network may include at least one convolutional layer, at least one pooling layer, and at least one fully connected layer. For example, convolution can be defined by two main parameters: the size of the input data (typically a 1×1, 3×3, or 5×5 matrix) and the depth of the output feature map (the number of kernels). These key parameters can be computed by convolution. These convolutions may start at depth 32, continue to depth 64, and end at depth 128 or 256. The convolution operation may mean an operation of sliding a kernel of size 3×3 or 5×5 over an input image matrix that is input data, multiplying each weight of the kernel and each element of the input image matrix that overlaps, and then adding them all.

An activation function may be applied to the output feature map generated in this way to finally output an activation map. In addition, the weight used in the current layer may be transmitted to the subsequent layer through convolution. The pooling layer may perform a pooling operation to reduce the size of the feature map by down-sampling the output data (i.e., the activation map). For example, the pooling operation may include, but is not limited to, max pooling and/or average pooling.

The maximum pooling operation uses the kernel, and outputs the maximum value in the area of the feature map overlapping the kernel by sliding the feature map and the kernel. The average pooling operation outputs an average value within the area of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., inferenced values), and output the classified class and a score thereof. Data output through the pooling layer forms a three-dimensional feature map, and this three-dimensional feature map can be converted into a one-dimensional vector and input as a fully connected layer.

Referring to FIG. 1, a neural network model processed by the neural processing unit 100 according to one example of the present disclosure may be related to image classification and object detection. The input data of the PE array 400 of the neural processing unit 1000 that processes the neural network model described above may be image data, and the output data of the PE array 400 may be a plurality of bounding box data for the input image. Each of the plurality of bounding box data may include bounding box coordinate data and class data. The bounding box coordinate data may include height data, width data, x data, and y data.

It has been described that the bounding box coordinate data includes height data, width data, x data, and y data as described above, assuming that the shape of the bounding box is a rectangle. However, the shape of the bounding box is not limited to a square, but may be transformed into a pentagon or more polygon or a circle, and accordingly, the number and type of bounding box coordinate data may vary according to the shape of the bounding box.

Further, the class data may include a plurality of classes categorized as existing inside the bounding box and a score thereof.

FIG. 4 is a schematic diagram describing energy consumption per unit operation of a neural processing unit, according to one example of the present disclosure.

Hereinafter, FIG. 4 will be described with respect to the power consumption reduction technology of the Memory 300 of the neural processing unit 100. Referring to FIG. 4, this is a table schematically explaining energy consumed per unit operation of the neural processing unit 100. Energy consumption can be divided into memory access, addition operation, and multiplication operation.

"8b Add" refers to an 8-bit integer addition operation of the adder 642. An 8-bit integer addition operation may consume 0.03 pj of energy. "16b Add" refers to the 16-bit integer addition operation of the adder 642. A 16-bit integer addition operation may consume 0.05 pj of energy. "32b Add" refers to a 32-bit integer addition operation of the adder 642. A 32-bit integer addition operation may consume 0.1 pj of energy. "16b FP Add" refers to a 16-bit floating-point addition operation of the adder 642. A 16-bit floating-point addition operation may consume 0.4 pj of energy. "32b FP Add" refers to a 32-bit floating-point addition operation of the adder 642. A 32-bit floating-point addition operation may consume 0.9 pj of energy. "8b Mult" refers to an 8-bit integer multiplication operation of the multiplier 641. An 8-bit integer multiplication operation may consume 0.2 pj of energy. "32b Mult" refers to a 32-bit integer multiplication operation of the multiplier 641. A 32-bit integer multiplication operation may consume 3.1 pj of energy. "16b FP Mult" refers to a 16-bit floating-point multiplication operation of the multiplier 641. A 16-bit floating-point multiplication operation may consume 1.1 pj of energy. "32b FP Mult" refers to a 32-bit floating-point multiplication operation of the multiplier 641. A 32-bit floating-point multiplication operation may consume 3.7 pj of energy. "32b SRAM Read" refers to a read access of 32 bits of data when the memory 300 is a static random access memory (SRAM). Reading 32 bits of data from the memory 300 may consume 5 pj of energy. "32b DRAM Read" refers to a read access of 32 bits of data when the main memory 3000 is DRAM. Reading 32 bits of data from main memory 3000 to memory 300 can consume 640 pj of energy. The unit of energy is the pico-joule (pj).

When the neural processing unit 1000 performs 32-bit floating point multiplication versus 8-bit integer multiplication, the energy consumption per unit operation is approximately 18.5 times different. When reading 32-bit data from the main memory 3000 configured as DRAM and reading 32-bit data from the memory 300 configured as SRAM, the energy consumption per unit operation is approximately 128 times different. In other words, from a power consumption perspective, power consumption increases as the number of bits in the data increases. Also, floating-point operations consume more power than integer operations. Also, reading data from DRAM increases power consumption dramatically.

Therefore, the memory 300 of the neural processing unit 1000 may be configured to include a high-speed static memory such as an SRAM tube and not include DRAM. However, the neural network processing unit according to examples of the present disclosure is not limited to SRAM. For example, the memory 300 may not include DRAM, and the memory 300 may be configured to include static memory configured to have relatively higher read and write speeds and consume relatively less power than the main memory 3000. Accordingly, the memory 300 of the neural processing unit 1000 according to one example of the present disclosure may be configured to have a relatively higher read and write speed and to consume relatively less power for the inference operations of the neural network model than the main memory 3000.

Static memories that can be driven at high speeds, such as SRAM, may include SRAM, magnetoresistive random access memory (MRAM), spin-transfer torque magnetic random-access memory (STT-MRAM), embedded magnetic random access memory (eMRAM), and orthogonal spin transfer magnetic random access memory (OST-MRAM). Furthermore, MRAM, STT-MRAM, eMRAM, and OST-MRAM are static memories and have non-volatile characteristics. Thus, a static memory capable of high-speed operation, such as SRAM, may beneficially obviate redundancy of providing additional memory to the main memory 3000 for rebooting after a power failure. However, examples according to the present disclosure are not limited thereto.

According to the above-described configuration, the neural processing unit 1000 reduces the power consumption by the DRAM during the inference operation of the neural network model. Furthermore, a memory cell of the SRAM of the memory 300 may comprise, for example, four to six transistors to store one bit of data. However, examples according to the present disclosure are not limited thereto. Further, a memory cell of the MRAM of the memory 300 may comprise, for example, one magnetic tunnel junction (MTJ) and one transistor to store one bit of data. However, examples according to the present disclosure are not limited thereto.

Figure 5:
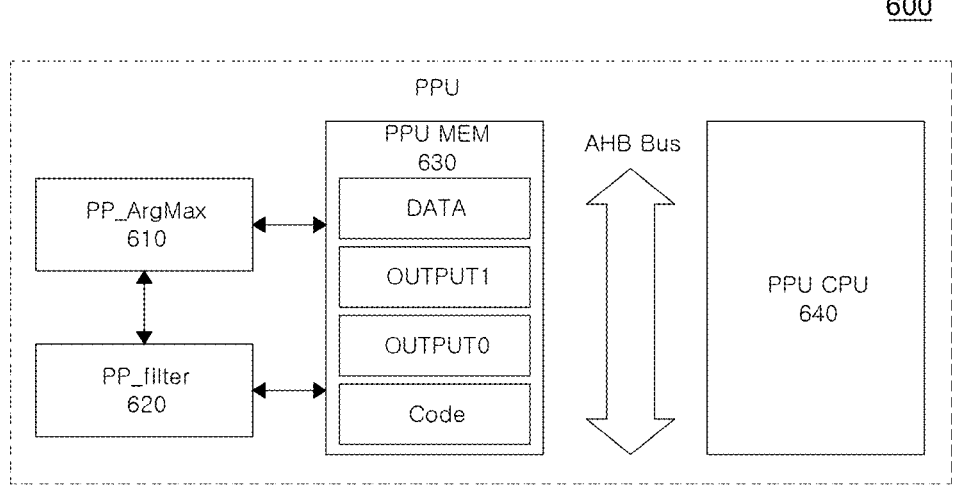
FIG. 5 is a schematic diagram illustrating a post-processing unit according to one example of the present disclosure.

The following describes in detail the specific configuration and operation of a post-processing unit (PPU) included in a neural processing unit according to one example of the present disclosure. FIG. 5 is a schematic diagram illustrating a PPU according to one example of the present disclosure. Referring to FIG. 5, the PPU 600 according to one example of the present disclosure may include, among other components, a first computation unit 610, a second computation unit 620, an internal processing unit 640, and an internal memory 630.

The first computation unit 610 may extract the highest scoring class of the plurality of classes associated with the one bounding box. The first computation unit 610 may perform a class-argmax operation to extract the index of the class having the highest score in the one bounding box and the class score of that class. The class score indicates, for each class corresponding to an object, the probability that the object is present in the bounding box.

The second computation unit 620 may extract only those bounding boxes of the plurality of bounding boxes having class confidence scores that are above a threshold confidence score. The class confidence score represents probability or confidence that a specific object of a certain class is present in the bounding box. The class confidence score is determined as a product of an object presence confidence score and the class score. The object presence confidence score indicates the probability that an object is present in a bounding box but regardless of what of the classes the object belongs to. The second computation unit 620 performs a bounding box filtering operation to extract only those bounding boxes whose product of the object presence confidence score of the bounding box and the class score extracted from the first computation unit 610 is above a certain threshold confidence score.

The internal processing unit 640 may post-process the data of the extracted bounding boxes in the second computation unit 620; that is, the internal processing unit 640 may decode the data of the extracted bounding boxes. Further, the internal processing unit 640 may perform a non-maximum suppression (NMS) operation on the data of the extracted bounding boxes.

The internal memory 630 may store data required for computations performed by the PPU 600. That is, the internal memory 630 may store data that is input or output from the first computation unit 610, the second computation unit 620, and the internal processing unit 640.

Referring to FIG. 5, the internal memory 630 may include a plurality of memory banks (e.g., DATA, OUTPUT1, OUTPUT2, and Code). A portion (DATA) of the plurality of memory banks may store a plurality of bounding box data output from the internal processing unit 640. Another portion (OUTPUT1, OUTPUT2) of the plurality of memory banks may store data on a plurality of bounding boxes received from the first computation unit 610 and the second computation unit 620. The other portion (Code) of the plurality of memory banks may store code data associated with post-processing data in the internal processing unit 640. However, the data stored in the plurality of memory banks is not limited to the above, and various types of data may be stored as needed.

Meanwhile, the inputs and outputs of the internal processing unit 640 may be transmitted through an advanced high-performance bus (AHB). The AHB refers to a high-performance bus protocol used primarily in system-on-chip (SoC) designs, which has the advantages of low power and scalability, which can improve the reliability and efficiency of the system.

Figure 6:
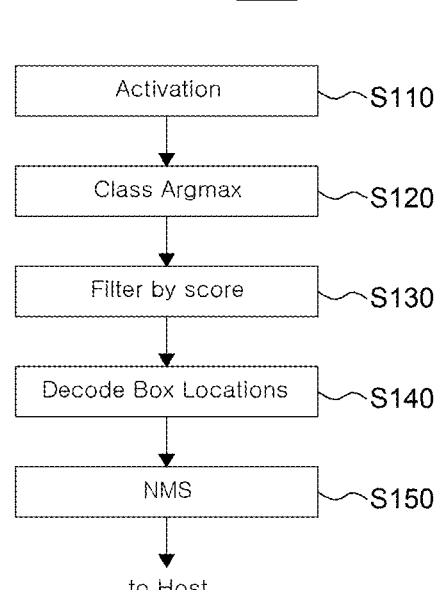
FIG. 6 is a flowchart illustrating a computation process of a neural processing unit including a post-processing unit, according to one example of the present disclosure.

FIG. 6 is a schematic diagram illustrating a computation process of a neural processing unit including a PPU according to one example of the present disclosure. For ease of description, reference will be made to the structure of the neural processing unit 100 including the PPU 600 shown in FIGS. 1 and 5.

The computation process S100 according to one example of the present disclosure may include an activation function operation step S110, a class-argmax operation step S120, a filtering operation step S130, a decoding operation step S140, and a non-maximum suppression (NMS) operation step S150.

In the activation function operation step S110, the SFU 500 may process a number of activation functions for imparting nonlinearity to the output feature map.

The activation functions processed by the special function unit (SFU, 500) may include, but are not limited to, a SiLU function, a Softmax function, a sigmoid function, a hyperbolic tangent (tanh) function, a ReLU function, a Leaky ReLU function, a Maxout function, or an ELU function that results in a nonlinear output value with respect to an input value.

On the other hand, not all activation functions may be supported in the neural processing unit 1000. Therefore, the neural processing unit 1000 may be programmed to approximate various activation functions via a piecewise linear function approximation algorithm and piecewise linear function processing circuitry. These activation functions can be optionally applied after the MAC operation. The operational value to which the activation function is applied may be referred to as the activation map.

The following describes in detail an activation function programming method that causes the neural processing unit 1000 to approximate various activation functions via a piecewise linear function approximation algorithm and piecewise linear function processing circuitry.

Figure 7:
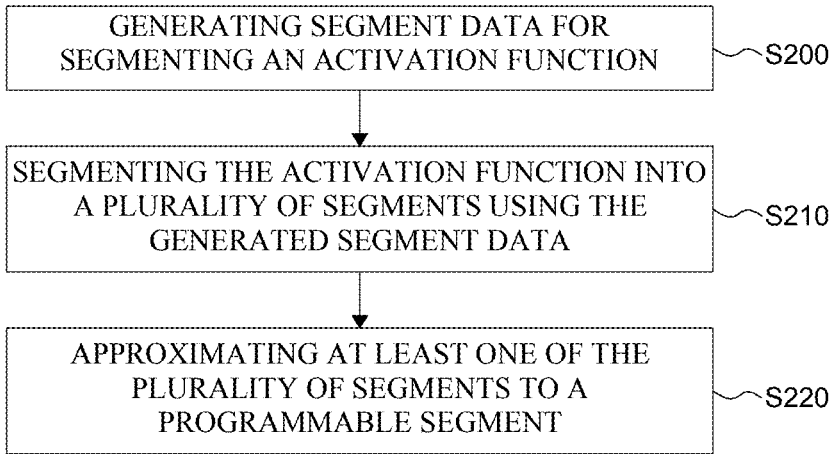
FIG. 7 is a flowchart illustrating an activation function programming method according to one example of the present disclosure.

FIG. 7 is a flowchart illustrating an activation function programming method according to one example of the present disclosure. Referring to FIG. 7, the activation function programming method includes a step S200 of generating segment data for segmenting an activation function, a step S210 of segmenting the activation function into a plurality of segments using the generated segment data, and a step S220 of approximating at least one of the plurality of segments to a programmable segment.

In the step S200, a segment data is generated. The segment data is the data generated to segment the activation function into a plurality of segments. In the step S210, the activation function is segmented into a plurality of segments using the generated segment data. In the present disclosure, the term "segment" means a portion of an activation function divided into a plurality of sections, and may be distinguished from a "candidate segment" or a "programmable segment," which is a term related to approximation of an activation function.

In various examples, the step S210 may include a step of determining the number and width of a plurality of segments based on segment data. In the step S210, the number of segments and the width of each of the plurality of segments segmenting the activation function to be transformed may be determined using the segment data. At least one of the plurality of segments may have the same width as or a different width than other segments.

In the present disclosure, a segment of a plurality of segments may be expressed as coordinates of start and end points along the x-axis. Meanwhile, when the number and width of each of the plurality of segments are determined, the coordinates of the segment of the plurality of segments may be obtained using the number and width of the plurality of segments.

In the step S220, at least one segment among the plurality of segments is approximated as a programmable segment. The programmable segment may be programmed according to the hardware configuration of the special function unit 500. That is, based on the hardware configuration of the special function unit 500, it may be configured to program an activation function that is desired to be processed by the neural processing unit 1000 as a programmed activation function (PAF). For example, the special function unit 500 may be configured to have hardware configured to operate each programmable segment with a particular slope and a particular offset.

In such cases, the special function unit 500 may program the programmable segment in the form of at least a first order function or a quadratic function with a slope and an offset. For example, the programmable segment may be approximated as a first order function according to certain judgment criteria. In such a case, the special function unit 500 may generate a programmable segment expressed in the form of '(slope a)*(input value x)+(offset b)'. The particular slope and particular offset described above may be programmable parameters. For programmable segments determined to be approximated by a first order function, step S220 may comprise approximating one selected segment with a particular slope and a particular offset value.

Additionally, in some examples, steps 210 and 220 may be performed simultaneously. Further, in some examples, steps 210 and 220 may be modified to include steps of segmenting the activation function into a plurality of segments using the generated segment data and approximating at least one of the plurality of segments as a programmable segment.

Figures 8A, 8B, 8C:
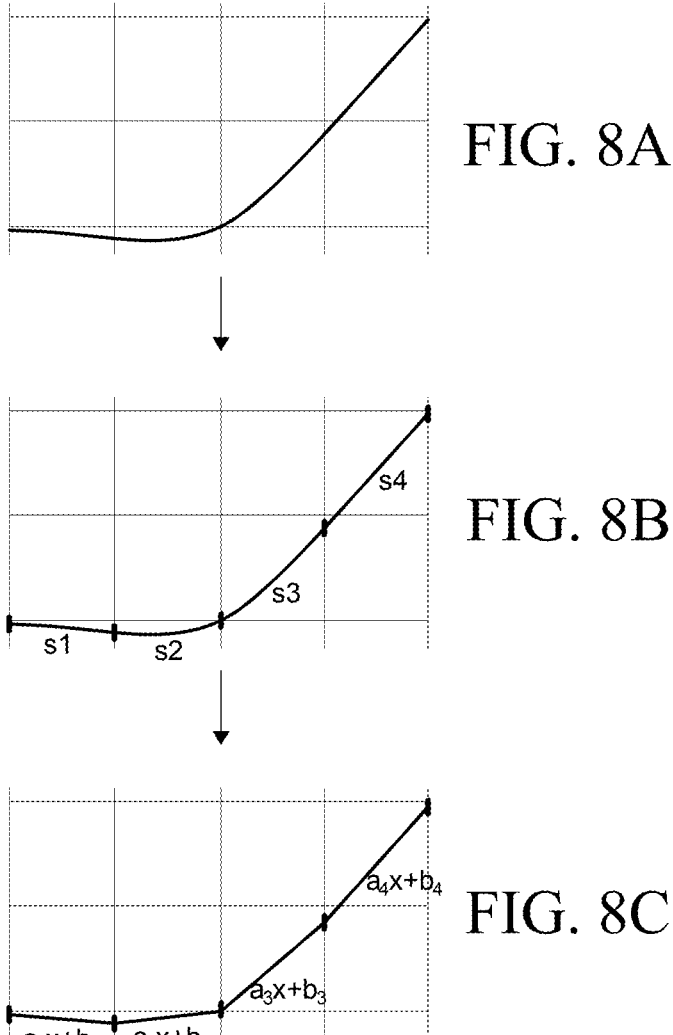
FIGS. 8A through 8C are graphs graph illustrating a process of approximating an activation function by an activation function programming method, according to one example of the present disclosure.

FIGS. 8A through 8D are diagrams illustrating a process of approximating an activation function by an activation function programming method according to one example of the present disclosure. A line representing the activation function of FIG. 8A may be segmented into a plurality of segments s1, s2, s3, and s4 using the segment data as shown in FIG. 8B. The plurality of segments s1, s2, s3, and s4 are approximated as programmable segments a1x+b1, a2x+b2, a3x+b3, and a4x+b4 as shown in FIG. 8C. Here, an example is described in which the SFU 500 has generated programmable parameters such that all programmable segments correspond to a first function.

Each programmable segment may include a corresponding programmable parameter. In FIG. 8C, all of the plurality of segments may be approximated as programmable segments in the form of a first order function. However, in various examples, some segments of the plurality of segments may be approximated by other types of programmable segments.

The SFU 500 may program each programmable segment in the form of a quadratic function, a quadratic function, a cubic function, a logarithmic function, or the like. For example, only segments S1, S2, S3, and S4 may be approximated as programmable segments where segment S2 may be approximated using various methods available in the device on which the activation function is to be processed. Specifically, if predetermined and stored lookup tables, nonlinear approximations, and the like are available in hardware for the segment S2, the segment S2 may be approximated using such predetermined and stored lookup tables, nonlinear approximations, and the like. In other words, the SFU 500 may be programed with each of the segments S1, S2, S3, and S4 independently.

The SFU 500 may be configured to independently determine an approximation method for each of the segments S1, S2, S3, and S4 based on hardware configuration information. For example, the SFU 500 may be configured to include circuitry that supports computing a first order function. In such a case, the SFU 500 may program each of the segments S1, S2, S3, and S4 in the form of a first-order function. For example, the SFU 500 may be configured to include circuitry that supports computing the first order function and the second order function. In such a case, the SFU 500 may program each of the segments S1, S2, S3, S4 in the form of a first order function or a second order function.

The SFU 500 may be configured to include circuitry to support first order function, second order function, and logarithmic function. In such a case, the SFU 500 may selectively program each of the segments S1, S2, S3, and S4 in the form of a first order function, a second order function, or a logarithmic function. For example, the SFU 500 may be configured to include circuitry to support first order function, second order function, logarithmic function operations and exponential function. In such a case, the SFU 500 may selectively program each of the segments S1, S2, S3, and S4 in the form of a first order function, a second order function, a logarithmic function or an exponential function.

When the SFU 500 is configured to include circuitry configured to support at least one specific function operation, the SFU 500 may program each of the segments S1, S2, S3, and S4 in the form of a corresponding specific function. For example, the SFU 500 may be configured to include at least one of a hardware-designed first order function calculation circuit, a second order function calculation circuit, a third order function calculation circuit, a logarithmic function calculation circuit, an exponential function calculation circuit, or similar function calculation circuits.

The SFU 500 may program a particular activation function in different techniques.

Alternatively, the SFU 500 may program a particular activation function as a first order function only. For example, the SFU 500 may program a particular activation function only as a second order function.

In other embodiments, the SFU 500 may program the particular activation function only as a third order function, a logarithmic function or an exponential function.

The SFU 500 may program each of the plurality of segments of the particular activation function as a corresponding approximation function. For example, the SFU 500 may program the plurality of segments of the particular activation function as a set of approximation functions of different formulas.

Figure 9A:
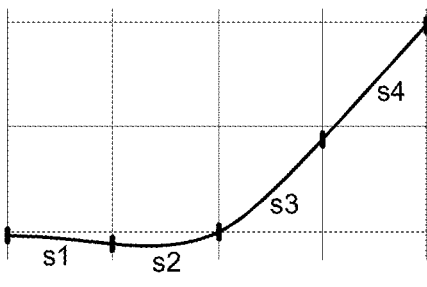
FIGS. 9A through 9D are graphs illustrating various instances of segmenting an activation function into a plurality of segments by an activation function programming method, according to one example of the present disclosure.
Figure 9B:
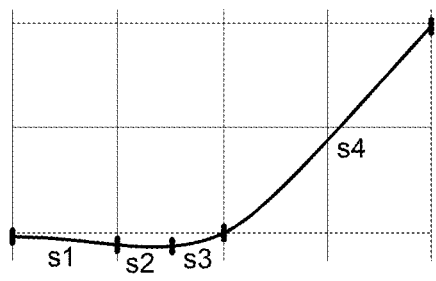
Figure 9C:
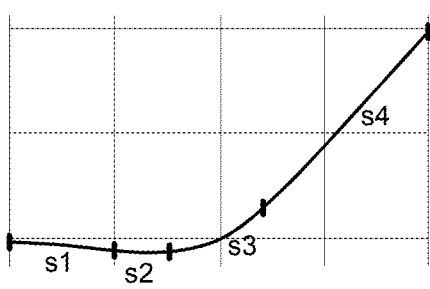
Figure 9D:
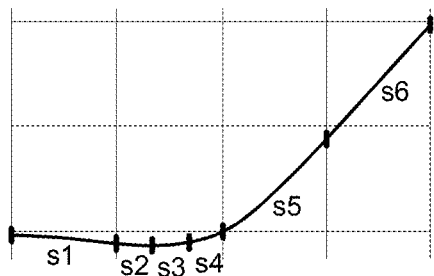

FIGS. 9A through 9D are diagrams illustrating various instances of segmenting an activation function into a plurality of segments by an activation function programming method according to one example of the present disclosure. Referring to FIG. 9A, a line representing the activation function may be segmented to have a uniform width with four segments. On the other hand, referring to FIG. 9B, the line representing the activation function may be segmented to have different widths with four segments. Similarly, referring to FIG. 9C, the line representing the activation function may be segmented into different widths with four segments. Referring to FIG. 9D, the line representing the activation function may be segmented to have a number of six segments with different widths. The number of the plurality of segments and the width of each of the plurality of segments may be determined using the segment data.

The SFU 500 may be configured to analyze the nonlinearity of the activation function to segment the plurality of segments into different widths. The SFU 500 may also analyze the nonlinearity of the activation function and segment each of the plurality of segments to an optimal width. However, the present disclosure is not limited thereto.

In the present disclosure, the activation function may be implemented in various forms that include characteristic segments. When segmenting an activation function into a plurality of segments, the number and width of the plurality of segments may be varied according to the different forms taken by the activation function.

For example, various activation functions, such as SiLU function, Softmax function, swish function, Mish function, sigmoid function, hyperbolic tangent function, hyperbolic tanh function, SELU function, Gaussian Error Linear Unit (GELU) function, SOFTPLUS function, ReLU function, Leaky ReLU function, Maxout function, ELU function, and the like, have various shapes that are divided into a plurality of characteristic intervals that include substantially linear intervals and/or nonlinear intervals. Accordingly, when approximating a nonlinear activation function in a hardware-processable manner, segmenting it by considering these characteristic intervals can result in a more efficient or close approximation of the activation function corresponding to the characteristics of each activation function. For example, the number and width of the segments may be determined by considering the substantially linear intervals, nonlinear intervals, and the like, Accordingly, in a method for approximating an activation function according to the present disclosure, the concept of segment data is used for segmenting the activation function in consideration of these characteristic intervals of the activation function. The segment data includes discontinuity information of the activation function, derivative data, information of the hardware on which the activation function is processed, and the like, and also includes data processed therefrom.

Referring to FIGS. 10A through 12B, an example of segmenting an activation function into a plurality of segments using discontinuity information in the segment data is described. FIGS. 10A through 10C are diagrams illustrating one example of segmenting an activation function into linear and nonlinear segments using slope change data of segment data in an activation function programming method according to one example of the present disclosure.

The slope change point of the activation function may refer to a point at which the slope of the activation function changes. For example, the SFU 500 may be configured to generate slope change data (e.g., differential data) for analyzing the slope change point of the activation function.

However, the slope change data of the present disclosure is not limited to differential data, and may include other similar data.

The slope change data, according to examples of the present disclosure, may include $n^{th}$ order derivatives of the activation function, such as first order derivatives, second order derivatives, third order derivatives, and the like. The gradient change data may represent a gradient change rate and a gradient change point associated with the activation function. Further, a slope change point may refer to a point $(d_1, d_2, and d_3)$ at which the slope change data is discontinuous, i.e., at a point $(d_1, d_2, and d_3)$ at which the slope change data is discontinuous, the slope of the activation function necessarily changes. Accordingly, a slope change point in the present disclosure may refer to a discontinuity in the nth derivative of the activation function, such as a first derivative, a second derivative, a third derivative, or the like.

FIG. 10B illustrates first derivative f' (x) of the differential data for the activation function f(x) shown in FIG. 10A. FIG. 10C illustrates a second derivative f''(x) of the derivative data for the activation function f(x) shown in FIG. 10A.

For example, the SFU 500 may be configured to extract the start and end points of the interval where the first derivative value does not change. As shown in FIG. 10B, the SFU 500 generates slope change data corresponding to the first derivative values. Further, the SFU 500 determines that the first derivative values in each of the w2 and w3 intervals are different, but there is no change in the first derivative value. Accordingly, the SFU 500 may determine that each of the w2 interval and the w3 interval is a linear interval, that is, the slope change data corresponding to the first derivative value does not change within the linear interval. However, since the first derivative values are different in each of the w2 and w3 intervals, the slope change data corresponding to the first derivative values at the boundaries of each of the w2 and w3 intervals have discontinuity points d1, d2. That is, the slope change data corresponding to the first derivative values at the boundaries of each of the w2 and w3 intervals are discontinuity points, and therefore, the boundaries of each of the w2 and w3 intervals may correspond to slope change points.

For example, the SFU 500 may be configured to extract the start and end points of the interval where the first derivative value does not change. As shown in FIG. 10B, the SFU 500 generates slope change data corresponding to the first derivative values. Further, the SFU 500 determines that the first derivative values in each of the w2 and w3 intervals are different, but there is no change in the first derivative value. Accordingly, the SFU 500 may determine that each of the w2 interval and the w3 interval is a linear interval, that is, the slope change data corresponding to the first derivative value does not change within the linear interval. However, since the first derivative values are different in each of the w2 and w3 intervals, the slope change data corresponding to the first derivative values at the boundaries of each of the w2 and w3 intervals have discontinuity points d1 and d2. That is, the slope change data corresponding to the first derivative values at the boundaries of each of the w2 and w3 intervals are discontinuity points, and therefore, the boundaries of each of the w2 and w3 intervals may correspond to slope change points.

In such a case, the SFU 500 may convert the linear interval into a programmable parameter in the form of a corresponding first order function. Thus, the linear interval of the activation function to be programmed can be segmented into a first order function with a specific slope and a specific offset. The first derivative of a linear interval can be a constant value. Additionally, the linear interval may be approximated by a first order function such that the approximation error value is zero. Therefore, the SFU 500 may determine that there is substantially no approximation error in each of the w2 and w3 intervals. That is, when the SFU 500 approximates each of the w2 and w3 intervals with a first order function, the approximation error value may be zero while minimizing the amount of computation, power consumption of the SFU 500.

The SFU 500 may be configured to determine an interval in which the first derivative of the activation function is a constant or non-zero as an interval in which the second derivative is more than a quadratic function or a curve (nonlinear function).

In the present disclosure, the term "linear interval" with respect to differential data may refer to an interval in which the first derivative of the activation function is an integer or zero, or an interval in which the activation function is represented by a first order function, and the term "nonlinear interval" may refer to an interval in which the first derivative of the activation function is not an integer or zero. However, the determination of a linear interval in the examples of the present disclosure is not determined solely by the derivative value, i.e., the SFU 500 may be configured to determine or distinguish linear intervals of the activation function in a variety of ways.

The SFU 500 may be configured to prioritize determining whether a linear interval exists. The SFU 500 may be configured to convert the linear interval to a programmable parameter in the form of a first order function, and the remaining nonlinear interval to a programmable parameter in the form of a particular function.

As a side note, the derivative data described in the examples of the present disclosure is merely one of mathematical methods for calculating the slope of the activation function. Accordingly, the present disclosure is not limited to derivatives, and it is possible to utilize substantially similar methods for calculating the slope.

The detection of the slope change points is not limited to the methods described above, and the SFU 500 may be configured to determine a point as a slope change point when the change in the first derivative of the activation function becomes greater than a certain threshold along the x-axis.

Then, the SFU 500 may be configured to extract the starting point and the ending point of a section in which the second derivative value does not change. As shown in FIG. 10C, the SFU 500 generates slope change data corresponding to the second derivative. Then, the SFU 500 determines that the second derivative values are different but not changing for the second derivative value in each of the sections w1-1 and w1-2. However, since the second derivative values are different in each of the w1-1 and w1-2 sections, the slope change data corresponding to the second derivative at the boundary between the w1-1 and w1-2 sections has a discontinuous point $d_3$. That is, since the slope change data corresponding to the second derivative at the boundary between the section w1-1 and the section w1-2 is a discontinuous point d3, the boundary between the w1-1 section and the w1-2 section may correspond to the gradient change point.

In this case, the SFU 500 may convert the nonlinear section into a programmable parameter in the form of a corresponding quadratic function. Therefore, the nonlinear section of the activation function to be programmed can be segmented into a quadratic function including coefficients of a quadratic term and coefficients of a linear function including a specific slope and a specific offset. The second derivative of the nonlinear section may be a constant value. In other words, even if the nonlinear section is approximated with a quadratic function, the approximation error value may be zero. Accordingly, the SFU 500 may determine that there is substantially no approximation error in each of the sections w1-1 and w1-2. That is, when the SFU 500 approximates each of the sections w1-1 and w1-2 with a quadratic function, the calculation amount and power consumption of the SFU 500 are minimized, and the approximation error value may also be zero.

However, the examples of the present disclosure are not limited to the examples of FIGS. 10A through 10C. It is possible that the intervals w1-1 and w1-2 be approximated by a first-order function. In such a case, the approximation error value may increase, but the power consumption of the neural processing unit 1000 may be reduced by reducing the computation amount of the SFU 500 of the neural processing unit 1000. In other words, the SFU 500 may determine the programmable parameters differently according to different priorities among computation amount, power consumption, and approximation error value.

The above-described second derivative of the activation function may indicate a rate of change of the slope of the activation function. Since a section in which the second derivative of the activation function is relatively large is a section in which the rate of change of the slope is large, the segment of the activation function corresponding to such section has a large change in slope such that there is a significant increase or decrease. Conversely, since a section in which the second derivative of the activation function is relatively small is a section in which the change rate of the slope is small, the segment of the activation function corresponding to such section has a small change in slope such that there is a small increase or decrease.

In particular, a section in which the second derivative of the activation function is less than or equal to a specific threshold value is the section in which the rate of change of the slope is very small.

Accordingly, the SFU 500 may be configured to determine the activation function of such section as a substantial linear function section in which the slope hardly changes. For example, the SFU 500 may be configured to determine a section in which the second derivative of the activation function is less than or equal to a threshold value is a "substantially linear section." The threshold for the second derivative of the activation function will be described later.

The differential order at which the differential value of the activation function becomes zero or an integer may represent the degree of change in the slope of the activation function. Specifically, in general, since the gradient of the function changes rapidly as the degree of the highest order term of the function increases, a section having a high degree of the highest order term of the activation function is a section having a steep slope change, and may be segmented to have a larger number of segments by distinguishing it from other sections.

The order of the highest order term of the activation function in a specific section may be determined through a differential order in which the differential value becomes zero or an integer in the specific section. For example, in the case of an activation function in which the highest order term is third-order in a specific section, since the third-order derivative of the activation function becomes an integer (i.e., the coefficient of the highest order term) in a specific section and the fourth-order derivative of the activation function becomes zero, an activation function in which the third-order derivative is an integer or the fourth-order derivative is zero in a specific section may be determined to have the third-order of the highest order term in the specific section.

In various examples, a section in which the degree of the highest order term of the activation function is third-order or higher may be segmented to have a larger number of segments in distinction from other sections. For example, the number of segments may be determined as the maximum number of segmentable segments for the corresponding section in hardware in which the activation function is to be processed.

The gradient change point of the activation function may be identified using the slope change data (i.e., the first derivative f'(x)). Using the slope change data (i.e., the first derivative f'(x)), the activation function f(x) can be segmented into three sections (w1, w2, w3) including two linear sections (w2, w3). That is, the SFU 500 may determine and segment the linear sections w2 and w3 and the nonlinear section w3 using slope change data of the activation function f(x) to be programmed.

An activation function f(x) may be segmented according to points or sections where the first derivative f'(x) is a constant (non-zero), zero, a curve below a threshold (non-linear function), or a curve (nonlinear function). In other words, the activation function f(x) may be segmented according to a point where the activation function f(x) is not differentiable or a point where the first derivative f'(x) is discontinuous.

Although the result of segmentation into three sections is shown in FIG. 10B, this is to briefly explain the process of segmenting into a linear section and a nonlinear section. Thus, it should be understood that the activation function f(x) may be segmented into four or more sections, that is, at least four segments, using the segment data.

For example, the linear section w1 may be further segmented into a plurality of sections using segment data according to the activation function programming method according to examples of the present disclosure. The activation function can be segmented into a larger number of segments and approximated by additional segmentation of the linear section w1, so that an approximation error can be reduced. In the present disclosure, the term "approximation error" means a difference between a specific segment of an activation function and a programmable segment that approximates the specific segment.

Figure 11A:
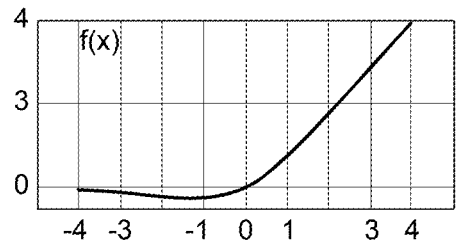
FIGS. 11A and 11B are graphs illustrating one example of segmenting an activation function into substantially linear and nonlinear intervals using slope change data among segment data in an activation function programming method, according to one example of the present disclosure.
Figure 11B:
Figure 11B:
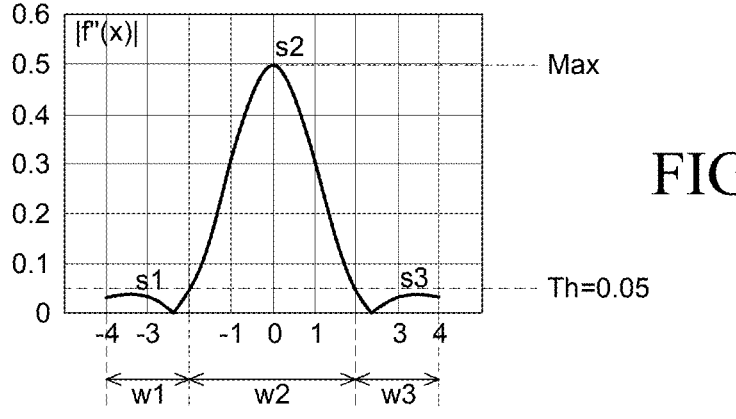

FIGS. 11A and 11B are graphs illustrating one example of segmenting an activation function into substantially linear and nonlinear intervals using slope change data among segment data in an activation function programming method according to one example of the present disclosure.

The absolute value of the second derivative f''(x) of the derivative data for the activation function f(x) of FIG. 11A is shown in FIG. 11B. The SFU 500 may be configured to determine a substantially linear section by setting a specific threshold value to the second derivative f''(x). Referring to FIG. 11B, when the maximum value Max of the absolute value of the second derivative f''(x) of the activation function f(x) is 0.5, a threshold value Th may be set as 0.05, which is 10% of the maximum value Max. The activation function has a linear characteristic as the second derivative f''(x) becomes smaller. Conversely, the activation function has and a nonlinear characteristic as the second derivative f''(x) becomes larger.

The threshold value Th may be determined as a relative ratio of the maximum value Max of the absolute value of the second derivative f''(x) of the activation function f(x). The threshold value Th of the substantially linear section may be determined based on whether an error occurring when approximating a nonlinear section into a linear section, is acceptable. For example, the threshold value of the substantially linear section may be determined according to the level of the error value of each segment that determines the degree of deterioration of inference accuracy of the DNN to which PAF is applied. In other words, as the threshold value of the substantially linear section increases, a segment of the linear section can be programmed more widely. Meanwhile, as the width of the segment increases, the number of segments may be reduced. That is, the total number and width of segments of the PAF may be different according to the threshold value of the substantially linear section.

The search for the substantially linear section may be performed after the search for the linear section. However, the present disclosure is not limited to the order of linear section search and substantial linear section search.

In the examples of FIG. 11B, the relative ratio may be determined to be 10%. However, the present disclosure is not limited thereto and may be determined as 5% of the maximum value Max according to the allowable error of the DNN. Using the differential data, that is, the second derivative f''(x), the activation function f(x) can be segmented by sections w1 and w3, in which the second derivative f''(x) is less than the threshold value Th of the substantially linear section, and the section w2, in which the second derivative f''(x) is greater than or equal to the threshold value Th of the substantially linear section. In the activation function f(x), a substantially linear sections w1 and w3 and a nonlinear section w2 may be determined and segmented using the slope change data. When the first to third sections w1, w2, and w3 are determined, the first to third segments s1, s2, and s3 may be programmed as programmable segments using corresponding programmable parameters.

In FIG. 11B, the result of segmentation into three segments s1, s2, and s3 corresponding to the three sections w1, w2, and w3 is shown. This is to briefly explain the process of segmenting into a substantially linear section and a nonlinear section. The activation function f(x) can be segmented into four or more sections, that is, at least four segments, using the segment data. For example, the nonlinear section w2 may be further segmented into a plurality of sections using segment data according to an activation function programming method according to examples of the present disclosure. Approximation errors may be reduced by additional segmentation of the nonlinear section w2.

Figure 12A:
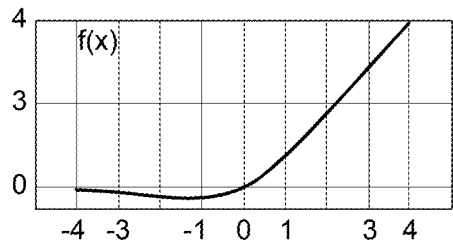
FIGS. 12A and 12B are graphs illustrating another example of segmenting an activation function into substantially linear and nonlinear intervals using slope change data among segment data in an activation function programming method, according to one example of the present disclosure.
Figure 12B:
Figure 12B:
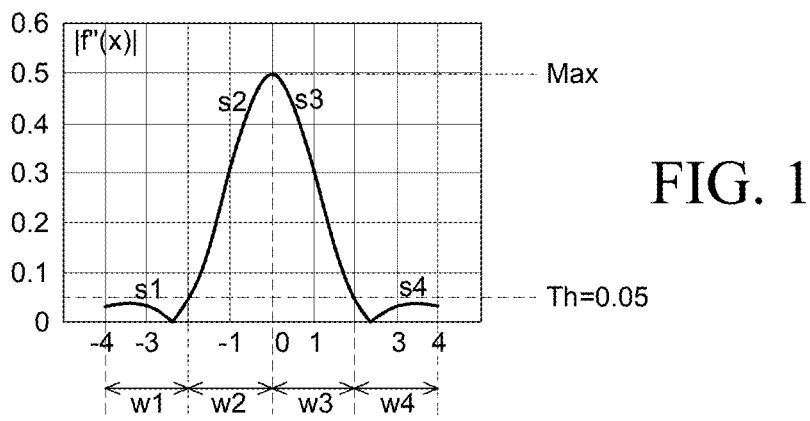

FIGS. 12A and 12B are graphs illustrating another example of segmenting an activation function into substantially linear and nonlinear intervals using slope change data among segment data in an activation function programming method according to one example of the present disclosure. Referring to FIGS. 12A and 12B, in the activation function f(x), a nonlinear section may be determined based on a threshold value Th of a substantially linear section of segment data, that is, an absolute value of a second derivative value f''(x). That is, a section greater than or equal to the threshold value Th of the substantially linear section may be determined as a nonlinear section. Specifically, referring to FIG. 12B, the SFU 500 may segment the activation function f(x) into a substantially linear section and a nonlinear section using differential data, that is, a second derivative f''(x). Furthermore, the SFU 500 may segment the nonlinear section of the activation function f(x) into segments s2 and s3 corresponding to the two sections w2 and w3, as an example. That is, the SFU 500 may classify the substantially linear section w1 and w4 and the nonlinear sections w2 and w3 using the slope change data of the activation function f(x), then the nonlinear sections w2 and w3 may be segmented.

The SFU 500 may be configured to search for optimal programmable parameters corresponding to each segment in various ways. For example, the SFU 500 may search for optimal programmable parameters capable of achieving specific performance among high-speed operation, low-power consumption, and suppression of deterioration of inference accuracy.

In FIG. 12B, segments s1, s2, s3, and s4 segmented into four sections w1, w2, w3, and w4 are shown. However, this is to briefly explain the process of segmenting into a substantially linear section and a nonlinear section. Accordingly, it should be understood that the activation function f(x) may be segmented into five or more sections, that is, at least five segments, using segment data.

For example, the nonlinear sections w2 and w3 may be further segmented into a plurality of sections using segment data according to an activation function programming method according to an example of the present disclosure. Specifically, the nonlinear sections w2 and w3 may be segmented based on the maximum value Max of the second derivative f"(x). That is, a region from the threshold value Th of the substantially linear section to the maximum value Max of the second-order derivative f"(x) is segmented into a section w2. Further, the threshold value Th of the substantially linear section from the maximum value Max of the second derivative value f"(x) is segmented into a section w3. An approximation error may be further reduced when additional segmentation is performed in the nonlinear sections w2 and w3.

Figure 13A:
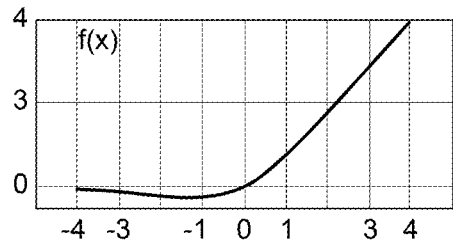
FIGS. 13A and 13B are graphs illustrating another example of segmenting an activation function into nonlinear intervals using gradient change data among segment data in an activation function programming method, according to one example of the present disclosure.
Figure 13B:
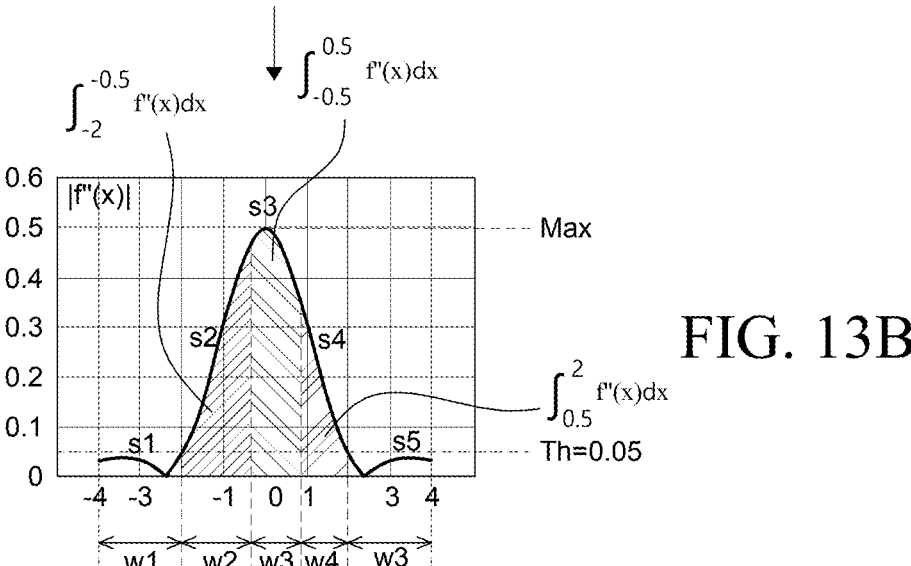

FIGS. 13A and 13B are graphs illustrating another example of segmenting an activation function into nonlinear intervals using gradient change data among segment data in an activation function programming method, according to one example of the present disclosure. Referring to FIGS. 13A and 13B, in the activation function f(x), a nonlinear section may be determined based on a threshold value Th of a substantially linear section of segment data, that is, an absolute value of a second derivative value f"(x). That is, a region greater than or equal to the threshold value Th of the substantially linear section may be determined as a nonlinear section. Specifically, referring to FIG. 8B, the SFU 500 may segment the activation function f(x) into a substantially linear section and a nonlinear section using differential data, that is, a second derivative f"(x). Furthermore, the SFU 500 may segment, for example, the nonlinear section of the activation function f(x) into segments s2, s3, and s4 corresponding to the three sections w2, w3, and w4.

The SFU 500 may classify substantially linear sections w1 and w5 and nonlinear sections w2, w3, and w4, and then segment the nonlinear sections w2, w3, and w4 using the slope change data of the activation function f(x).

The example of the present disclosure is not limited to the substantially linear section, and the substantially linear section may also be segmented into nonlinear sections. That is, the step of determining the substantially linear section may not be performed in some cases.

The SFU 500 may be configured to search for optimal programmable parameters corresponding to each segment in various ways. For example, the SFU 500 may search for optimal programmable parameters capable of achieving specific performance among high-speed operation, low-power consumption, and suppression of deterioration of inference accuracy.

In FIG. 13B, segments s1, s2, s3, s4, and s5 segmented into five sections w1, w2, w3, w4, and w5 are shown. However, this is to briefly explain the process of segmenting into a substantially linear section and a nonlinear section. Accordingly, it should be understood that the activation function f(x) may be segmented into six or more sections, that is, at least six segments, using segment data. However, the example of the present disclosure is not limited to the substantially linear section, and the substantially linear section may also be segmented into nonlinear sections.

For example, the nonlinear sections w2, w3, and w4 may be further segmented into a plurality of sections using segment data according to the activation function programming method according to an example of the present disclosure. Specifically, the nonlinear sections w2, w3, and w4 may be segmented based on the integral value ($\int$f"(x)dx) of the second derivative f"(x). In other words, the SFU 500 may segment the nonlinear sections based on the integral value of the slope change data.

When the value of the integral ($\int$f"(x)dx) of the second derivative f"(x) is high, an approximation error value between the PAF and the activation function may increase. That is, when the value of the integral ($\int$f"(x)dx) of the second derivative value f"(x) is high, an error may occur, resulting in deterioration of inference accuracy. On the other hand, as the value of the integral ($\int$f"(x)dx) of the second-order derivative f"(x) increases, the width of the segment may widen. Conversely, the smaller the value of the integral ($\int$f"(x)dx) of the second derivative f"(x), the narrower the width of the segment may be.

Accordingly, the SFU 500 may set an integral value ($\int$f"(x)dx) of the specific second derivative f"(x) as the integral threshold value of the segment approximation error. For example, the SFU 500 may integrate the second derivative f"(x) from the end of the section w1. Accordingly, the section w2 may be from the end of the section w1 until the preset integration threshold of the segment approximation error reaches a specific value.

More specifically, in the section w2, the integral $$\left( \int_{-2}^{-0.5} f''(x)dx \right)$$

of the second derivative f"(x) may be segmented into s2 to correspond to the integral threshold value of the segment approximation error. Further, in the section w3, the integral $$\left( \int_{-0.5}^{0.5} f''(x)dx \right)$$

of the second derivative f"(x) may be segmented into s3 to correspond to the integral threshold value of the segment approximation error. Further, in the section w4, the integral $$\left( \int_{0.5}^{2} f''(x)dx \right)$$

of the second derivative f"(x) may be segmented into s4 to correspond to the integral threshold value of the segment approximation error.

That is, all of the integral value $$\left(\int_{-2}^{-0.5} f''(x)dx\right)$$

of the second derivative f"(x) in the section w2, the integral value $$\left(\int_{-0.5}^{0.5} f''(x)dx\right)$$

of the second derivative f"(x) in the section w3, and the integral value $$\left(\int_{0.5}^{2} f''(x)dx\right)$$

of the second derivative f"(x) in the section w4 may be the same value as the integral threshold value of the segment approximation error.

However, the integral threshold of the segment approximation error can be affected by hardware data including at least one of the number of comparators of the SFU 500 of the neural processing unit 1000, the number of gates used to implement circuits of the SFU 500, and the types of implemented arithmetic circuits (linear function circuit, quadratic function circuit, cubic function circuit, exponential circuit, logarithmic circuit, antilog circuit, and the like). That is, the SFU 500 may be configured to determine an integral threshold value of segment approximation error in consideration of the hardware data.

The smaller the integral threshold value of the segment approximation error, the closer the PAF can be to the activation function. In other words, when the integral threshold value of the segment approximation error decreases, the number of programmable segments increases, and thus the approximation error value of the PAF can be further reduced.

However, since the number of programmable segments is limited by hardware data, there is a limit to reducing the integral threshold value of the segment approximation error. That is, the lowest limit of the integral threshold value of the segment approximation error may be determined according to the hardware data.

Approximation errors can be further reduced when additional segmenting is performed in the aforementioned nonlinear sections w2, w3, and w4. However, the example of the present disclosure is not limited to the substantially linear section, and the substantially linear section may also be segmented into nonlinear sections. That is, the step of determining the substantially linear section may not be performed in some cases.

As shown in FIGS. 10A to 13B, the SFU 500 may determine a linear section from the activation function before approximating the activation function by segmenting the activation function using the slope change data. When the SFU 500 segments the activation function using the slope change data, it may determine a nonlinear section from the activation function before approximating the activation function. When the SFU 500 segments the activation function using the slope change data, it may determine a substantially linear section from the activation function before approximating the activation function.

A segment with a distinct linear section or substantially linear section can be approximated as a programmable segment expressed in the form of "(slope a)×(input value x)+(offset b)." A segment with a linear section or substantially linear section is in the form of a linear function or substantially linear function with a substantially constant slope. Therefore, comparing the activation function with a programmable segment expressed as a slope and an offset, the programmed segment has no approximation error or can be minimized.

If the activation function is programmed using the slope change data, the amount of calculation and power consumption for the linear section or the substantially linear section can be greatly reduced. Further, the activation function programmed with a linear or substantially linear section according to the examples of the present disclosure is efficient and the approximation error is minimized, and thus it is possible to provide an improvement in the operation speed of DNN processed in the neural processing unit 1000, a minimization of deterioration in inference accuracy, and a reduction in power consumption of the neural processing unit 1000.

In various examples, the step S210 may further include determining a linear section of the activation function based on the slope change data of the activation function.

In various examples, the step S210 may further include determining a nonlinear section of the activation function based on the slope change data of the activation function.

In various examples, the step S210 may further include determining a substantially linear section of the activation function based on the slope change data of the activation function.

In various examples, the step S210 may further include determining a linear section and a nonlinear section of the activation function based on the slope change data of the activation function.

In various examples, the step S210 may further include determining a substantially linear section and a nonlinear section of the activation function based on the slope change data of the activation function.

In various examples, the step S210 may further include determining a linear section, a substantially linear section, and a nonlinear section of the activation function based on the differential data of the activation function.

However, the examples of the present disclosure are not limited to the differential data of the activation function, and it is also possible to perform various mathematical analyzes capable of analyzing the slope change and linearity of the activation function.

In various examples, segment data may include information of hardware on which an activation function is processed. In the activation function programming method according to examples of the present disclosure, an activation function may be segmented using hardware information. The hardware data may include at least one of the number of comparators of the SFU 500 of the neural processing unit 1000, the number of gates used to implement circuits of the SFU 500, and the types of implemented arithmetic circuits (linear function circuit, quadratic function circuit, cubic function circuit, exponential circuit, logarithmic circuit, antilog circuit, and the like).

For example, the number of segments for segmenting the activation function may be limited according to the number of comparators of the SFU 500 of the neural processing unit 1000. Accordingly, the activation function may be segmented into the maximum number of segments that can be processed by the neural processing unit 1000 to be processed or the number of segments corresponding to the allocated resources of the neural processing unit 1000. Accordingly, the SFU 500 can program the activation function using predetermined hardware resources more efficiently and/or in a more customized manner.

In various examples, the step 220 may further include approximating at least one of the plurality of segments to a programmable segment based on the gradient change point.

In various examples, the step 220 may further include approximating at least one of the plurality of segments to a programmable segment based on the error value.

In the present disclosure, the term "error value" or "approximation error value" means the difference between a specific segment of an activation function and a programmable segment to which the specific segment is approximated. The approximation error value may further include an average value, a minimum value, a maximum value, and an accumulated value. In other words, the SFU 500 may be configured to calculate an average error value, a minimum error value, a maximum error value, an accumulated error value, and the like between a specific segment and an approximated programmable segment. The cumulative error value may be a value obtained by integrating error values between a specific segment and an approximated programmable segment.

Regarding the error value, the various activation functions can be divided into a plurality of characteristic sections including (substantially) linear sections and/or nonlinear sections, and if these characteristic sections are segmented into segments of the same width, the error value for each segment varies significantly. Accordingly, in the activation function programming method according to examples of the present disclosure, in order to reduce an approximation error, at least one feature of these characteristic sections may be considered and approximated into programmable segments.

In various examples, the step S220 may further include calculating an error value by comparing the gradient and offset of the programmable segment with a corresponding segment of the activation function.

In various examples, the step S220 may further include determining a programmable parameter for converting at least one segment of an activation function into the programmable segment. In other words, the step S220 may further include searching for optimal programmable parameters for converting at least one segment of the activation function into a programmable segment. When the programmable segment is a linear function, the programmable parameters may include a gradient and an offset corresponding to the linear function. When the programmable segment is a quadratic function, the programmable parameter may include coefficients of the quadratic term corresponding to the quadratic function. Coefficients of a quadratic function may include quadratic coefficients, linear coefficients, and constants. An approximation function of the programmable parameter may be determined in consideration of performance such as high-speed operation, low power consumption, and suppression of deterioration of inference accuracy. For example, as the formula of the approximation function becomes more complicated, the calculation speed may decrease and power consumption may increase. As the approximation error decreases, deterioration in inference accuracy may be reduced.

In various examples, the step S220 may further include calculating an error value between at least one segment of the activation function and at least one candidate segment having a (temporary) gradient and a (temporary) offset. As the number of candidate segments increases, the possibility of searching for a preferred programmable parameter value increases and the search time may be increased.

In various examples, the step S220 may include determining a parameter of the at least one candidate segment as a programmable parameter of the programmable segment based on the calculated error values.

Accordingly, the SFU 500 may provide programmed activation function data to the neural processing unit 1000. The programmed activation function data may include at least one programmed activation function. Here, the programmed activation function data may include programmable parameters corresponding to each programmable segment of at least one programmed activation function.

Hereinafter, a process of approximating at least one segment among a plurality of segments to a programmable segment based on an error value will be described in detail with reference to FIGS. 14 to 16B.

In the process of programming an activation function, a step may appear at a boundary between programmable segments. In the activation function programming method according to examples of the present disclosure, an approximation error can be greatly reduced by generating a predetermined step between programmable segments or at the start and/or end of one programmable segment.

Accordingly, in the present disclosure, an error value can be significantly reduced by allowing a step between programmable segments in the process of segmenting the activation function into a plurality of segments using segment data and approximating at least one segment among the plurality of segments to a programmable segment based on an error value.

Figure 14:
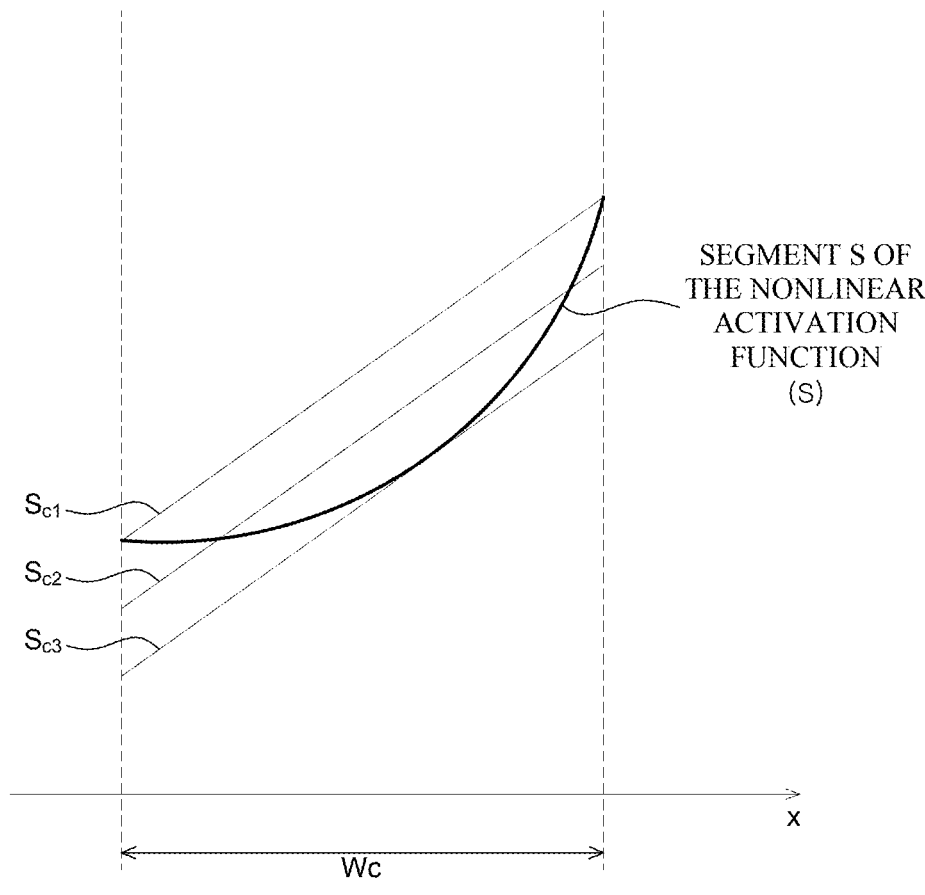
FIG. 14 is a graph illustrating an example of converting one segment into one programmable segment using an error value in an activation function programming method, according to one example of the present disclosure.

FIG. 14 is a graph illustrating an example of converting one segment into one programmable segment using an error value in an activation function programming method according to one example of the present disclosure. Referring to FIG. 14, a plurality of candidate segments $S_{c1}$, $S_{c2}$, and $S_{c3}$ for the segment S of the nonlinear activation function are shown.

In examples of the present disclosure, the term "candidate segment" means a function that can become a programmable segment expressed by a "programmable parameter" using an activation function programming method. When the programmable segment is expressed as a linear function, the programmable segment may be expressed as "(gradient a)×(input value x)+(offset b)." Programmable parameters include gradient a and offset b.

For example, when the programmable segment is expressed as a quadratic function, the programmable segment can be expressed as "(quadratic coefficient a)×(input value x2)+(linear coefficient b)×(input value x)+(constant c)." The programmable parameters include a quadratic coefficient a, a linear coefficient b, and a constant c. The programmable parameter may be configured to have a form capable of expressing both a first-order function and a second-order function. However, the present disclosure is not limited to the format of programmable parameters.

Hereinafter, a linear function will be described as an example. The candidate segment may be in the form of a linear function corresponding to a programmable segment segmented using segment data. Candidate segments for one segment may be determined by a linear function passing through the start and end points of one segment.

For example, a candidate segment for a segment may be a linear function having an offset adjusted while having the same gradient as a linear function passing through the start and end points of the segment.

For example, the candidate segment for a segment may be a linear function having an offset adjusted while having a different gradient from a linear function passing through the start and end points of one segment.

For example, a candidate segment for a segment may be determined as one of the tangents of the segment.

In FIG. 14, to briefly describe a process of determining a programmable segment among a plurality of candidate segments, three candidate segments having a common gradient passing through the start and end points of the segment S are shown. The first candidate segment $S_{c1}$ is a linear function passing through the start and end points of the segment S, the second candidate segment $S_{c2}$ and the third candidate segment $S_{c3}$ are linear functions having offsets adjusted while having a common slope with the first candidate segment $S_{c1}$, and the third candidate segment $S_{c3}$ has an offset such that the candidate segment $S_{c3}$ is tangent to the segment S. The candidate segments shown in FIG. 14 are for briefly describing segments that can become approximated programmable segments, and the gradient and/or offset of actual candidate segments can be adjusted in various ways to reduce an error value.

In various examples, at least one segment among a plurality of segments may be approximated as a programmable segment by searching for an error value $\Delta y$. The SFU 500 may determine the width of each of the plurality of segments as a uniform width. Subsequently, the SFU 500 may approximate at least one segment of a plurality of segments to a programmable segment by searching for an error value $\Delta y$ of the at least one segment. However, the present disclosure is not limited thereto.

Figures 15A, 15B:
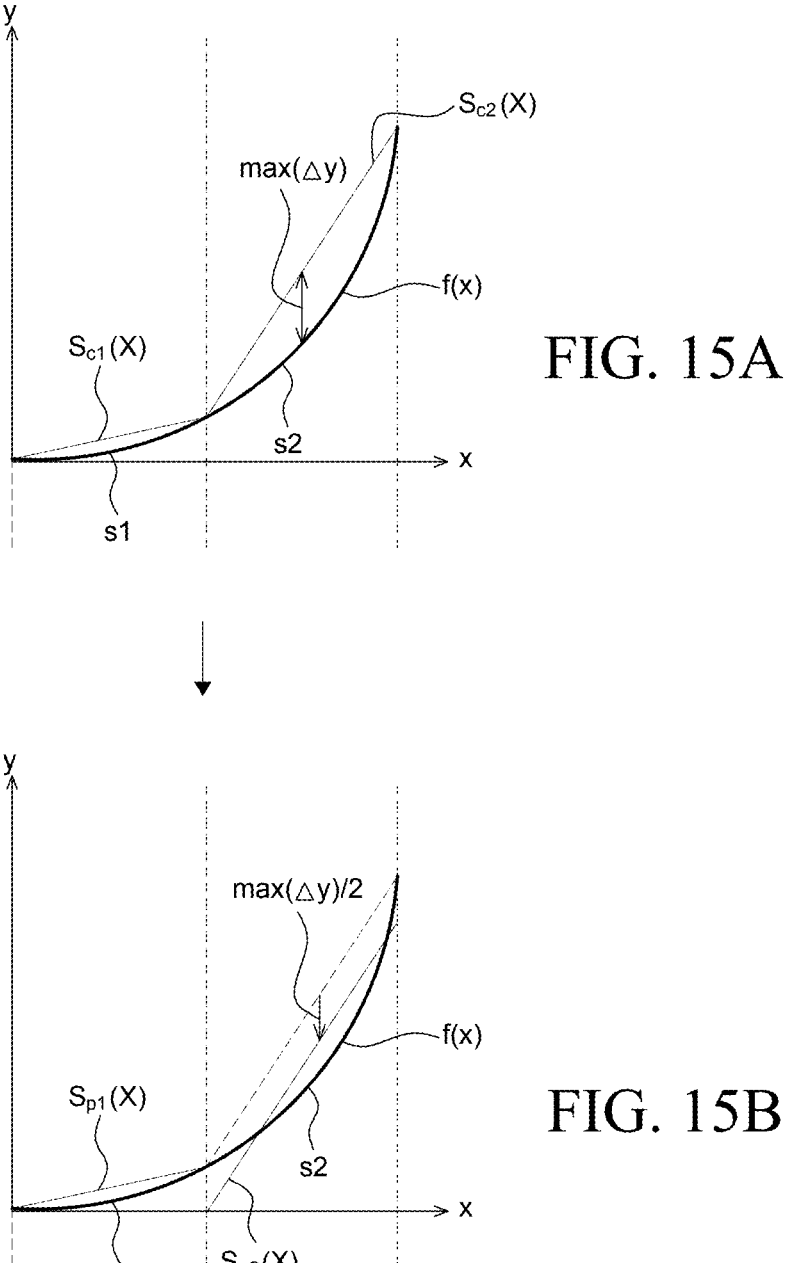
FIGS. 15A and 15B are graphs illustrating one example of approximating a one segment to a programmable segment by exploring a maximum error value, according to one example of the present disclosure.

FIGS. 15A and 15B are graphs illustrating one example of approximating a one segment to a programmable segment by exploring a maximum error value (max($\Delta y$)), which is the largest of the error values ($\Delta y$) in an activation function programming method according to one example of the present disclosure. FIG. 15A shows segments s1 and s2 segmenting the activation function f(x), a first candidate segment $S_{c1}$(x) corresponding to the first segment s1, and a second candidate segment $S_{c2}$(x) corresponding to the second segment s2. In FIG. 15A, each of the candidate segments $S_{c1}$(x) and $S_{c2}$(x) searches for preferred programmable parameters (i.e., gradient and offset) representing each linear function passing through the start and end points of each of the segments s1 and s2.

As in an example shown in FIG. 15A, the SFU 500 calculates an error value $\Delta y$ between the second segment s2 and the second candidate segment $S_{c2}$(x), that is, the absolute value of "f(x)$-S_{c2}$(x)" or |f(x)$-S_{c2}$(x)|. The SFU 500 may calculate a maximum error value max($\Delta y$), which is the largest value of the error values $\Delta y$. In order to reduce the maximum error value max($\Delta y$) of the second segment s2, as shown in FIG. 15B, the second candidate segment obtained by adjusting the candidate segment $S_{c2}$(x) in the y-axis direction (i.e., adjusting the offset) by max($\Delta y$)/2, which is half of the maximum error value max($\Delta y$), may be determined as the second programmable segment $S_{p2}$(x) obtained by approximating the second segment s2.

When the first programmable segment $S_{p1}$(x) obtained by approximating the first segment s1 is shown as in FIG. 15B, a step may appear between the first programmable segment $S_{p1}$(x) and the second programmable segment $S_{p2}$(x).

In FIG. 15B, such step at the junction of adjacent programmable segments in y-axis may be intentionally induced in the process of approximating the second segment s2 of the activation function f(x) to a programmable segment based on the error value |f(x)$-S_{c2}$(x)|. In the process of approximating a specific programmable segment to reduce the maximum error value within the specific programmable segment, a step may be generated at a point of boundary between adjacent programmable segments. In other words, each programmable segment may be approximated independently of each other.

As the approximation error value of the activation function increases, deterioration of inference accuracy of the neural processing unit 1000 using approximated the activation function may increase. Conversely, as the approximation error value of the activation function decreases, deterioration in inference accuracy of the neural processing unit 1000 using the approximated activation function may decrease.

In various examples, at least one segment among the plurality of segments may be approximated as a programmable segment using an integral value $\int[s_c(x)-f(x)]dx$ of the error value. The SFU 500 may be configured to integrate or accumulate approximation error values of each segment.

In more detail, the first programmable segment $S_{p1}$(x) and the second programmable segment $S_{p2}$(x) may be programmed in different ways. That is, each programmable segment can be programmed by selecting a method such as a linear function, a quadratic function, a logarithmic function, an exponential function, and the like, respectively. Thus, each programmable segment can be programmed with the same function or can be programmed with a different function.

Figures 16A, 16B:
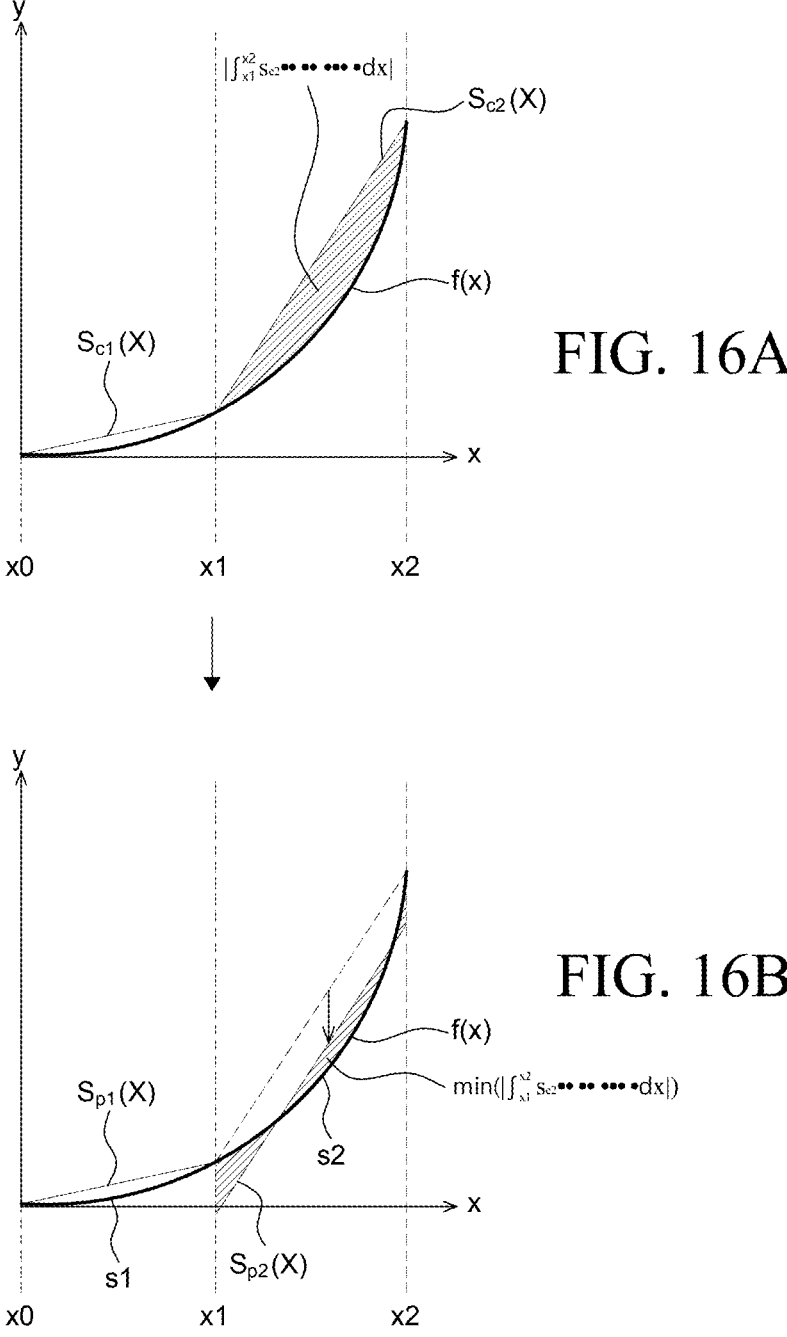
FIGS. 16A and 16B are graphs illustrating an example of approximating a one segment as a programmable segment using an integral over an error value in an activation function programming method, according to one example of the present disclosure.

FIGS. 16A and 16B are graphs illustrating an example of approximating a one segment as a programmable segment using an integral over an error value ($\int[sc(x)-f(x)]dx$) in an activation function programming method according to one example of the present disclosure. FIG. 16A shows segments s1 and s2 segmenting the activation function f(x), a first candidate segment $S_{c1}$(x) corresponding to the first segment s1, and a second candidate segment $s_{c2}$(x) corresponding to the second segment s2. In FIG. 16A, for each of the candidate segments $S_{c1}$(x) and $S_{c2}$(x), an optimal programmable parameter (i.e., gradient and offset) expressing a linear function is searched for the start and end points of each of the segments s1 and s2. The offset of the second candidate segment $S_{c2}$(x) may be adjusted while having the same gradient as a linear function passing through the start and end points of the second segment s2. Alternatively, the offset may be adjusted while having a gradient different from that of the linear function passing through the start and end points of the second segment s2.

Referring to FIGS. 15A through and 16B, the first segment s1 includes a start point x0 and an end point x1. Here, the start point x0 and the end point x1 may mean segment boundary values. Referring to FIGS. 15A through 16B, the second segment s2 includes a start point x1 and an end point x2. The start point x0 and the ending point x1 may mean segment boundary values. For example, the first segment s1 may be set from a start point x0 to less than an end point x1. Also, the second segment s2 may be set from a start point x1 to less than an end point x2.

Programmable parameters may be configured to include segment boundary values.

As shown in FIG. 16A, the SFU 500 calculates an integral value $$\left( \int_{x1}^{x2} s_{c2}(x) - f(x)dx \right)$$

between the second segment s2 and the candidate segment $S_{c1}(x)$ as an approximation error value, and searches for a candidate segment having the smallest absolute value of the integral value $$\left(\left|\int_{x1}^{x2} s_{c2}(x) - f(x)dx\right|\right).$$

As shown in FIG. 16B, in order to reduce the error value, a candidate segment having the smallest absolute value of the integral value $$\left(\left|\int_{x1}^{x2} s_{c2}(x) - f(x)dx\right|\right),$$

that is, min $$\left(\left|\int_{x1}^{x2} s_{c2}(x) - f(x)dx\right|\right),$$

may be determined as the second programmable segment $S_{p2}(x)$.

When the first programmable segment $S_{p1}(x)$ approximating the first segment s1 is shown in FIG. 16B, a discontinuous step may appear in the y-axis between the first programmable segment $S_{p1}(x)$ and the second programmable segment $S_{p2}(x)$. In FIG. 16B, such a step may occur in the process of approximating the second segment s2 of the activation function f(x) to the second programmable segment $S_{p2}(x)$ based on the approximation error value. However, deterioration of inference accuracy of the neural processing unit 1000 using the approximated activation function can be reduced if the approximation error value of each programmable segment is reduced even if the discontinuous step is present.

In various examples, the step S220 may further include searching for a minimum approximation error value between the programmable segment and the corresponding segment of the activation function. The approximation error value may be at least one of an average error value, a minimum error value, a maximum error value, and an accumulated error value.

For example, the step S220 may further include searching for at least one minimum error value between at least one programmable segment and a corresponding segment of at least one activation function.

For example, the step S220 may further include determining the slope and offset of the programmable segment based on the at least one minimum error value searched.

For example, the step S220 may include approximating the at least one segment to the programmable segment according to the determined gradient and offset.

In various examples, the step S220 may further include determining the programmable segment using machine learning using a loss function.

Figure 17:
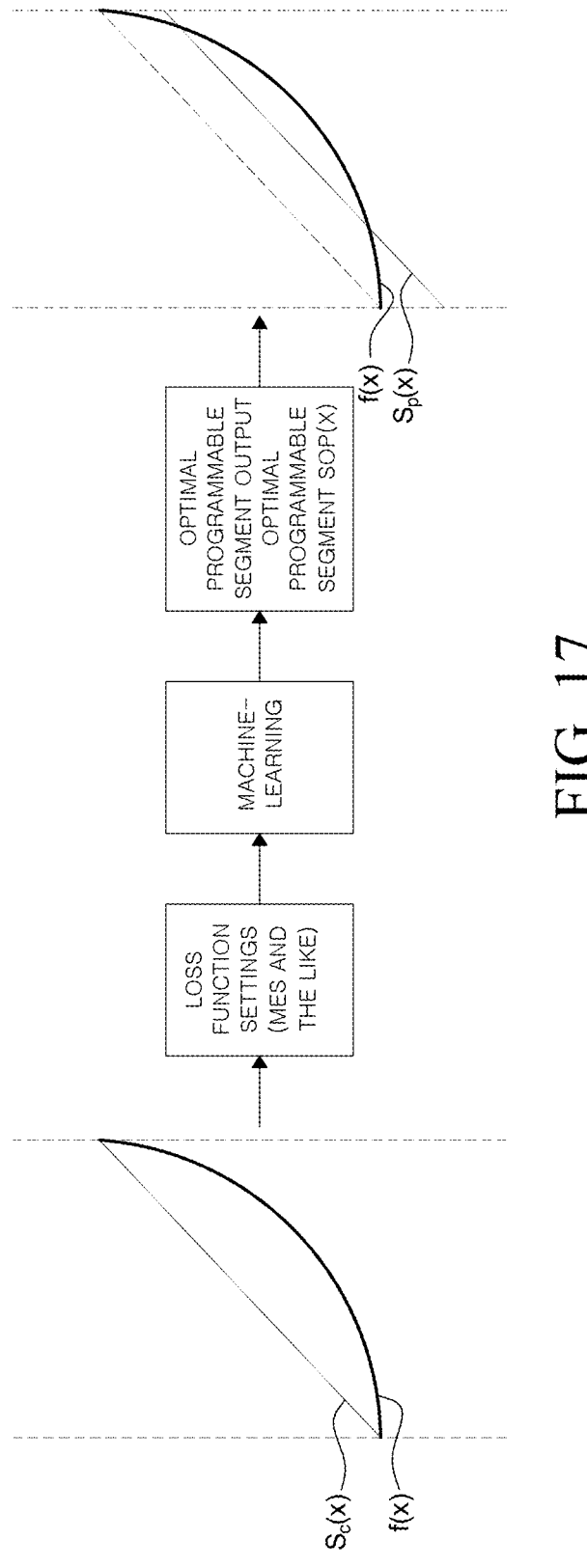
FIG. 17 is a graph illustrating an example of approximating a segment to an optimal programmable segment using machine learning in an activation function programming method, according to one example of the present disclosure.

FIG. 17 is a graph illustrating an example of approximating a segment to an optimal programmable segment using machine learning in an activation function programming method, according to one example of the present disclosure. Referring to FIG. 17, the SFU 500 may set a candidate segment $s_c(x)$ for the activation function f(x) as an initial value of the loss function. The SFU 500 may determine a candidate segment having the smallest value of the loss function as a preferable programmable segment $S_{op}(x)$ through machine learning. Accordingly, a preferable programmable parameter may be explored.

To search for the preferable parameter, learning may be repeatedly performed. One-time learning may mean one epoch. As the number of times of learning increases, the error value may be reduced. If the number of trainings is too few, it can lead to under-fitting. In contrast, too many training times can lead to over-fitting.

As the loss function, mean squared error (MSE), root mean squared error (RMSE), and the like may be used, but it is not limited thereto. In the present disclosure, a candidate segment used as an initial value for a loss function may be, for example, a linear function, a quadratic function, a cubic function, or the like approximated to correspond to segmented segments using segment data. However, examples according to the present disclosure are not limited to the above functions. The loss function may be used after the activation function f(x) is segmented into a plurality of segments using segment data.

Accordingly, machine-learning using the loss function may be performed after considering characteristics of the activation function thereof, such as a plurality of characteristic sections including a (substantially) linear section and/or a nonlinear section of the activation function, an approximation error, and the like. Therefore, the calculation amount and search time of the optimized programmable parameter search can be reduced, and deterioration in inference accuracy of the neural processing unit 1000 due to the use of PAF can be minimized.

In addition, according to examples of the present disclosure, an effect of reducing the number of unnecessary segments may be provided. That is, according to examples of the present disclosure, it is also possible to reduce the number of segments. In other words, if the sum of approximation error values of two adjacent programmable segments is less than a preset threshold value, the two programmable segments may be integrated into one programmable segment.

In various examples, the step S210 may further include segmenting the activation function into a plurality of segments using an integral (accumulated value) of the second derivative of the activation function. The accumulated value of the second derivative may be used as segment data.

In one embodiment, the step S210 may further include calculating an accumulated value of the second derivative of the activation function.

In one embodiment, the step S210 may further include segmenting the activation function into a plurality of segments based on the integral threshold of the segment approximation error (i.e., the threshold of the accumulated second derivative).

Furthermore, the activation function programming method according to the present disclosure may include a step of firstly adjusting the threshold of the accumulated value of the second derivative when the number of the plurality of segments determined by segmenting the activation function into a plurality of segments using the accumulated value of the second derivative is greater than or less than a target number, and re-segmenting the activation function into another number of plurality of segments based on the adjusted threshold. Specifically, the threshold can be adjusted such that: (1) when the number of the determined plurality of segments is greater than the target number, the threshold is adjusted to increase, and (2) when the determined number of the plurality of segments is less than the target number, the threshold is adjusted to decrease.

In various examples, the SFU 500 may segment the activation function into a plurality of segments based on a threshold value of the accumulated value of the second derivative. In this case, the SFU 500 may segment all sections of the activation function based on the threshold value of the accumulated value of the second derivative or a portion of sections of the activation function based on the threshold value of the accumulated value of the second derivative. In particular, the SFU 500 may determine that some section of the activation function as a nonlinear section rather than a (substantially) linear section, and may segment only a partial section that is a nonlinear section based on a threshold value of the accumulated value of the second derivative value. The SFU 500 may segment the remaining sections that are not nonlinear sections by the activation function programming method described in various examples of the present disclosure.

Figure 18:
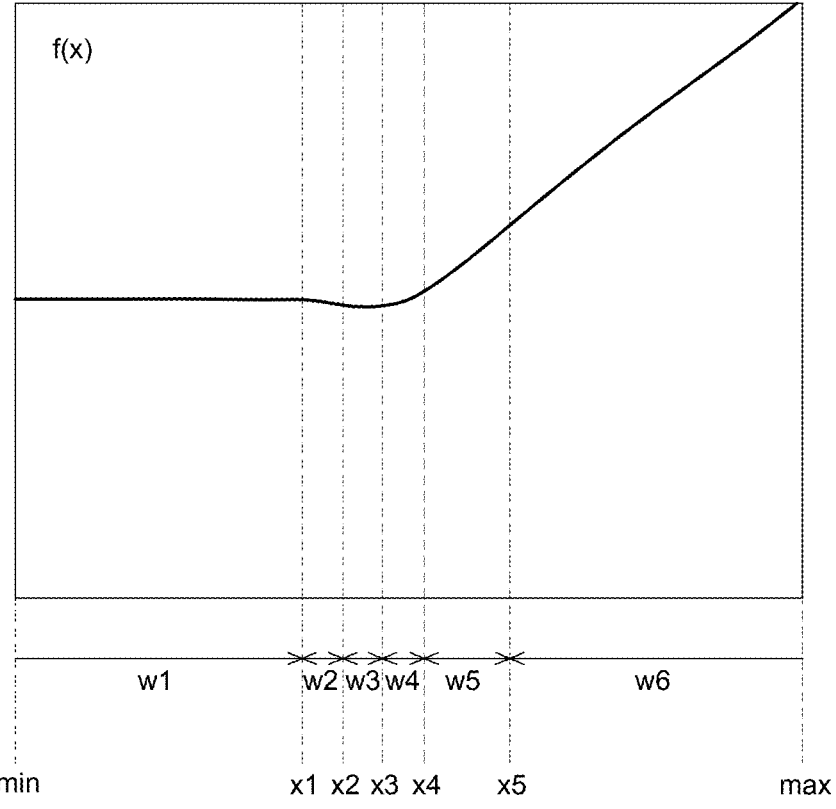
FIG. 18 is a graph illustrating an example of segmenting an activation function using an integral threshold of the segment approximation error of the activation function in an activation function programming method, according to one example of the present disclosure.

FIG. 18 is a graph illustrating an example of segmenting a line representing an activation function using an integral threshold of the segment approximation error of the activation function in an activation function programming method, according to one example of the present disclosure. Referring to FIG. 18, the activation function f(x) may be segmented using the accumulated value of second derivatives of the activation function f(x), that is, $\int f''(x)dx$. A point of the minimum value (min) of the x-axis of the activation function f(x) may be determined as a starting point or a point of the maximum value (max) of the x-axis may be determined as the starting point. However, the present disclosure is not limited thereto, and the starting point may also be a particular point.

The SFU 500 may be programmed to include a plurality of segment boundary values x1, x2, x3, x4, and x5 of the activation function. The SFU 500 may be programmed to further include, for example, a minimum value (min) and a maximum value (max) of the activation function. The minimum value (min) and maximum value (max) may be utilized when implementing clipping for improving programming efficiency of an activation function according to examples of the present disclosure. The activation function may output a minimum value f(min) for an x value less than or equal to the minimum value. The activation function may output the maximum value f(min) for an x value equal to or more than the maximum value.

The activation function f(x) is segmented, from the starting point, for each section in which the accumulated value of the second derivative of the activation function f(x) reaches the threshold value ETh (i.e., the integral threshold value of the segment approximation error). For example, the SFU 500 may determine w1 when $$\int_{min}^{x1} f''(x)dx = E_{Th},$$

w2 when $$\int_{x1}^{x2} f''(x)dx = E_{Th},$$

w3 when $$\int_{x2}^{x3} f''(x)dx = E_{Th},$$

w4 when $$\int_{x3}^{x4} f''(x)dx = E_{Th},$$

w5 when $$\int_{x4}^{x5} f''(x)dx = E_{Th},$$

and w6 when $$\int_{x5}^{min} f''(x)dx = E_{Th}.$$

To elaborate, it is also possible to set a different value of $E_{Th}$ for each segment; and it is possible to set a plurality of $E_{Th}$ values, such as $E_{Th1}$ and $E_{Th2}$ values, depending on the case.

In addition, the programmable activation function used in the neural network operation may be configured to process only input values within a limited range. For example, the minimum value (min) of the x-axis, which is an input value of the programmable activation function, may be minus six, and the maximum value (max) may be six. According to the above configuration, there is an effect that the data size of the programmed activation function can be reduced. However, the present disclosure is not limited thereto.

Referring to FIG. 18, since the accumulated value of the second derivative of the activation function is the rate of change of the slope of the activation function, it can be determined such that: (1) in the activation function f(x), widths w2, w3, and w4 of the segments corresponding to sections having a relatively large gradient change rate are determined to be relatively narrow, and (2) in the activation function f(x), widths w1 and w6 of the segments including the portion that is a linear function with no rate of change of the slope are determined to be relatively wide.

Figure 20:
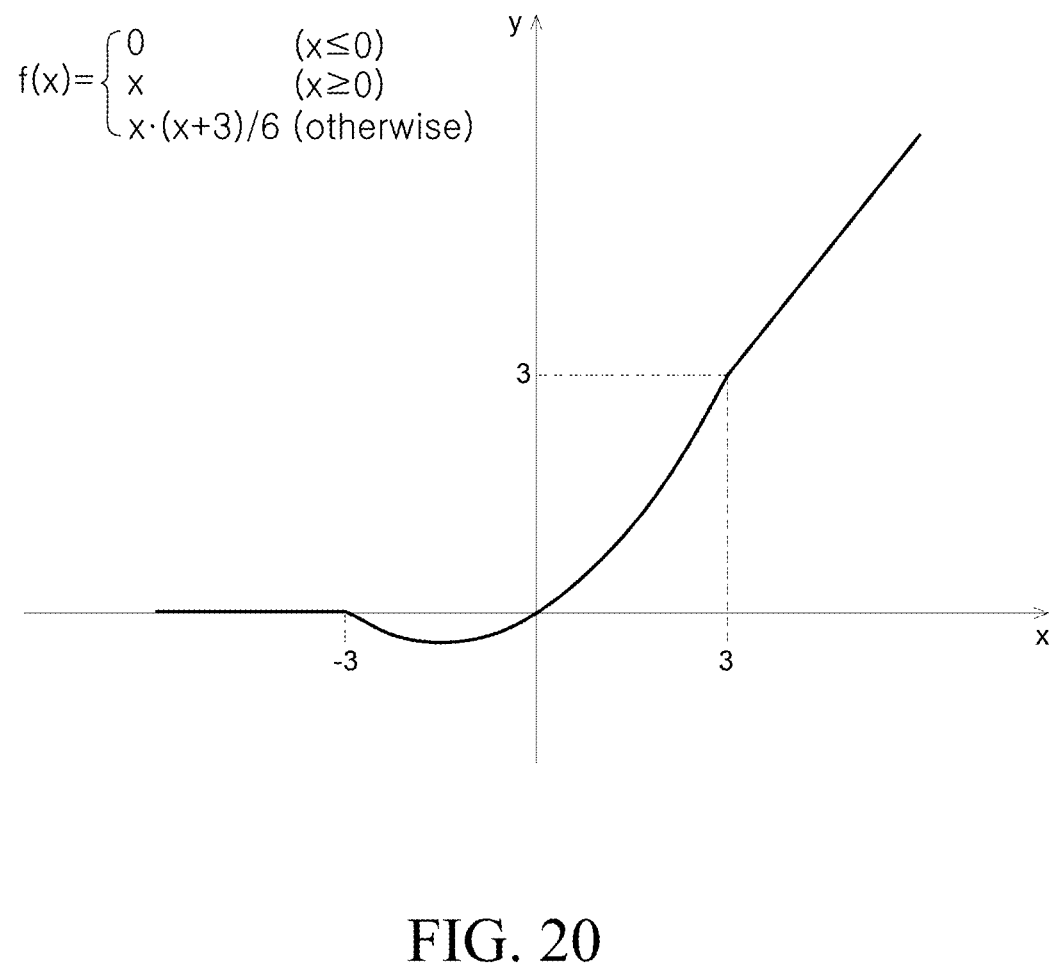

FIGS. 19 and 20 are graphs illustrating an ELU activation function and a Hardswish activation function, respectively. The ELU activation function f(x) is x for x>0 and α(ex−1) for x≤0 (where α is a hyperparameter). As shown in FIG. 19, the ELU activation function has a linear section when the x value is zero or more, and has a nonlinear section when the x value is less than zero. That is, the ELU activation function has characteristics which are divided into a linear section and a nonlinear section.

The Hardswish activation function f(x) is 0 for x≤−3, x for x≥+3, and x×(x+3)/6 for −3<x<+3. As shown in FIG. 19, the Hardswish activation function has a linear section when the value of x is less than minus three or greater than three, and has a nonlinear section otherwise. That is, the Hardswish activation function has characteristics which are divided into a linear section and a nonlinear section.

However, the present disclosure is not limited to the ELU activation function and the Hardswish activation function, and there are various activation functions having characteristics divided into a linear section and a nonlinear section. In the field of neural networks, various customized activation functions in which various linear and nonlinear functions are combined to improve the accuracy of neural networks have been proposed. In this case, the activation function programming method according to examples of the present disclosure may be more effective.

In the activation function programming method according to the present disclosure, the SFU 500 may distinguish a linear section and a nonlinear section of the activation function, and furthermore may distinguish a substantially linear section and a nonlinear section, so that the activation function can be selectively segmented into a plurality of segments. Accordingly, the activation function programming method according to the present disclosure is efficient and minimizes approximation errors, particularly in programming for approximating activation functions having (substantially) linear and nonlinear sections, and thus, it is possible to provide an improvement in the operation speed of a neural network model processed in the neural processing unit 1000, a minimization of deterioration in inference accuracy, and a reduction in power consumption of the neural processing unit 1000. In the activation function programming method according to the present disclosure, the SFU 500 may generate programmable parameters of at least one segment. The neural processing unit 1000 may process at least one programmed activation function based on the above information. The neural processing unit 1000 may receive the information and process at least one programmed activation function.

Figure 21:
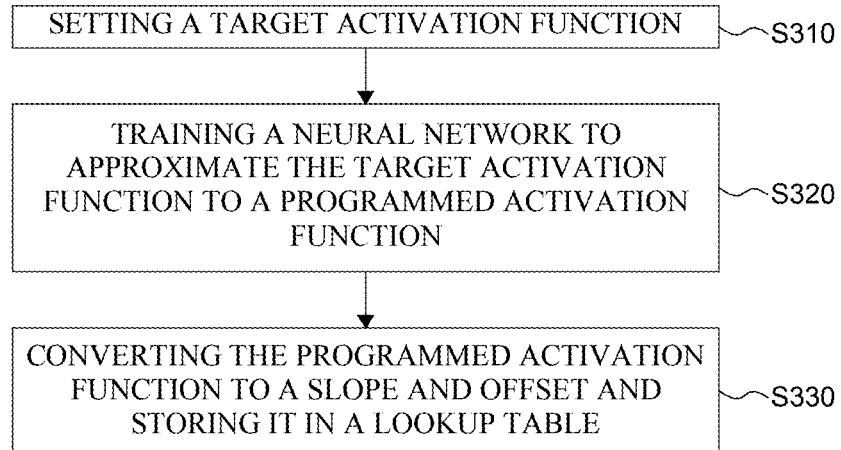
FIG. 21 is a flowchart illustrating a programming method for an activation function according to one example of the present disclosure.
Figure 22:
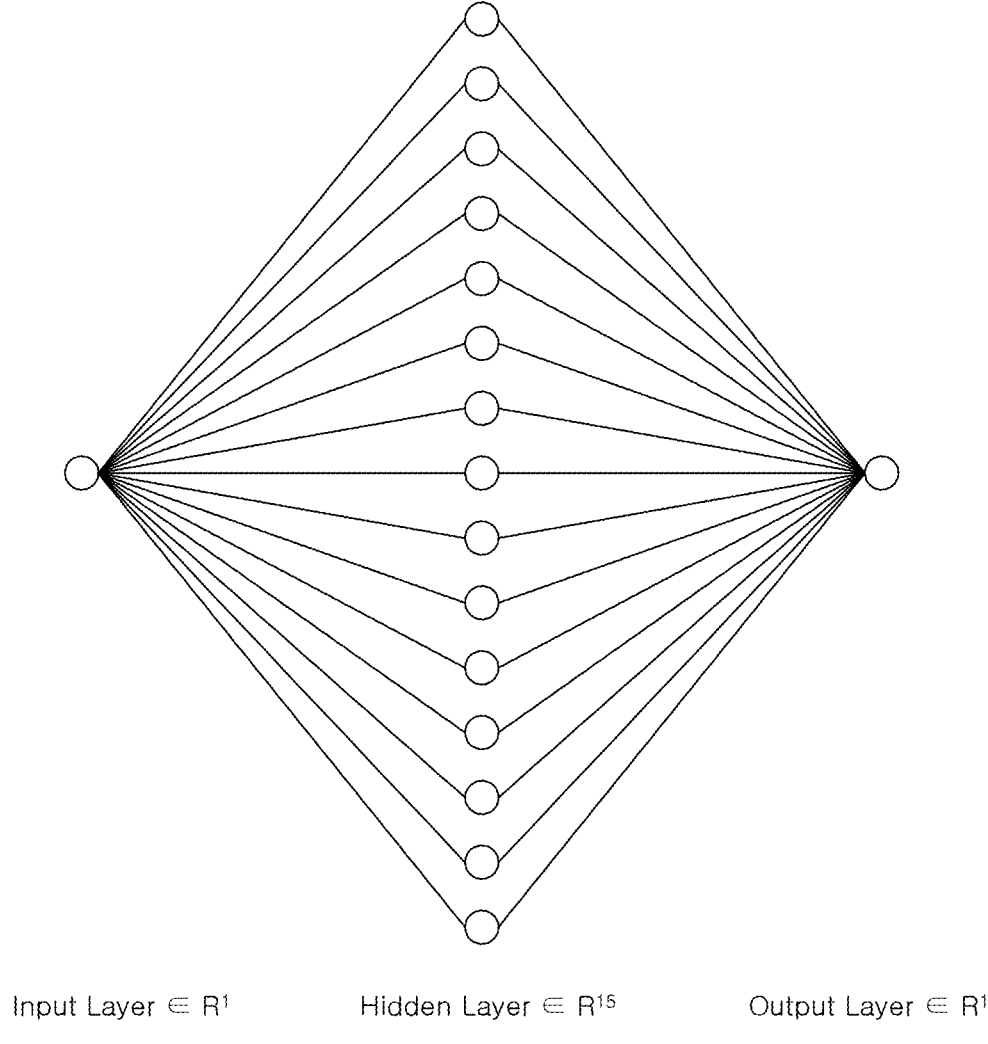
FIG. 22 is a diagram illustrating a neural network used for approximation of an activation function according to one example of the present disclosure.

FIG. 21 is a flowchart illustrating a programming method for an activation function according to one example of the present disclosure. FIG. 22 is a diagram illustrating a neural network used for approximation of an activation function according to one example of the present disclosure.

Referring to FIG. 21, an activation function programming method includes the steps of setting a target activation function S310, training a neural network to approximate the target activation function to a programmed activation function S320, and converting the programmed activation function to a slope and offset and storing it in a lookup table S330.

In the step S310, the activation function that is the target activation function to be programmed is set. For example, the target activation function can be a swish function, a Mish function, a sigmoid function, a hyperbolic tangent (tanh) function, a SELU function, a gaussian error linear unit (GELU) function, a SOFTPLUS function, a square root (SQRT) function, and other nonlinear functions. In the step S320, the target activation function is approximated by the programmed activation function through training of the neural network.

Referring to FIG. 22, the neural network used to approximate the target activation function may comprise two layers and a plurality of rectified linear unit (ReLU) functions disposed between the two layers. That is, the neural network used for the approximation operation of the target activation function may be composed of two neural network sections and a plurality of Rectified Linear Unit (ReLU) functions disposed between the two neural network sections.

The first neural network section means between the nodes of the input layer and the nodes of the hidden layer. That is, the first neural network section may be referred to as the first layer.

The second neural network section means between the nodes of the hidden layer and the nodes of the output layer. That is, the second neural network section may be referred to as the second layer.

At least one neuron in the first neural network section include a connection network including weights connecting nodes of the input layer and nodes of the hidden layer.

At least one neuron in the second neural network section include a connection network including weights connecting nodes of the hidden layer and nodes of the output layer and a corresponding activation function.

More specifically, the first neural network section includes at least one neuron. Each of the plurality of neurons in the first neural network section has one node in the input layer as an input and each of the plurality of nodes in the hidden layer as an output.

For example, the number of neurons in the first neural network section may be fifteen. Accordingly, the number of nodes in the plurality of hidden layers may be fifteen. However, the number of neurons in the first neural network section and the number of nodes in the hidden layer may be varied as desired.

Further, the first neural network section may be a fully connected layer in which one node of the input layer as an input and a plurality of nodes of the hidden layer as outputs are fully connected. Accordingly, each of the plurality of neurons in the first neural network section may have a weight and a bias. That is, the weight of each of the plurality of neurons in the first neural network section may be represented by $n_1, n_2, \ldots n_{15}$, and the bias of each of the plurality of neurons in the first neural network section may be represented by $b_1, b_2, \ldots b_{15}$.

Thus, when input x is fed to the first neural network section, each of the plurality of nodes in the hidden layer may output $z_i = n_i{}^*x + b_i$. Then, a rectified linear unit (ReLU) function may be applied to the output of each of the plurality of neurons in the first neural network section.

Rectified linear unit (ReLU) (z) can be expressed as max(0, z), which means that all negative values can be converted to zero when the ReLU function is applied. Therefore, the output value of the first neural network section with the rectified linear unit (ReLU) function applied can be expressed as $ReLU(n_i{}^*x + b_i)$.

The second neural network section also includes at least one neuron. Each of the plurality of neurons in the second neural network section has each of the plurality of nodes in the hidden layer as an input and one node in the output layer as an output. For example, the number of neurons in the second neural network section may be fifteen. Accordingly, the number of plurality of nodes in the hidden layer may be fifteen. However, the number of neurons in the second neural network section and the number of nodes in the hidden layer can be varied as needed.

Furthermore, the second neural network section may be a fully connected layer in which the plurality of nodes of the hidden layer as inputs and one node of the output layer as outputs are fully connected. Accordingly, each of the plurality of neurons included in the second neural network section may have a weight. That is, the weight of each of the plurality of neurons included in the second neural network section may be represented by $m_1, m_2, \ldots m_{15}$.

Accordingly, the second neural network section may be given as an input the output value of the first neural network section, or $ReLU(n_i{}^*x + b_i)$. Therefore, the output of the second neural network section is the sum of the output of the first neural network section, $ReLU(n_i{}^*x + b_i)$, multiplied by the weight of the second neural network section. One node of the output layer, which is the output of the second neural network section, can be output with an operation value according to Equation 1.

$$\sum_{i=1}^{15} m_i \times ReLU(n_i \times x + b_i) \qquad \text{Equation 1}$$

By performing the above-described operation of the neural network, the error between the approximated programmed function and the target activation function is calculated, and the training of the neural network is repeatedly performed so that the error value is reduced. Through the training process described above, the activation function conversion program unit can approximate the target activation function to the programmed activation function.

Finally, by calculating the breaking point of the programmed activation function, linear sections of the programmed activation function can be set. Each linear section can then be segmented into a first-order function with a specific slope and a specific offset.

In the step S320, the programmed activation functions are converted to slopes and offsets and stored in a lookup table.

As described above, each of the programmed activation functions can be segmented into a first-order function with a specific slope and a specific offset for each of the linear segments. Accordingly, the specific slope and specific offset for each of the linear segments can be stored in the lookup table.

Figure 23:
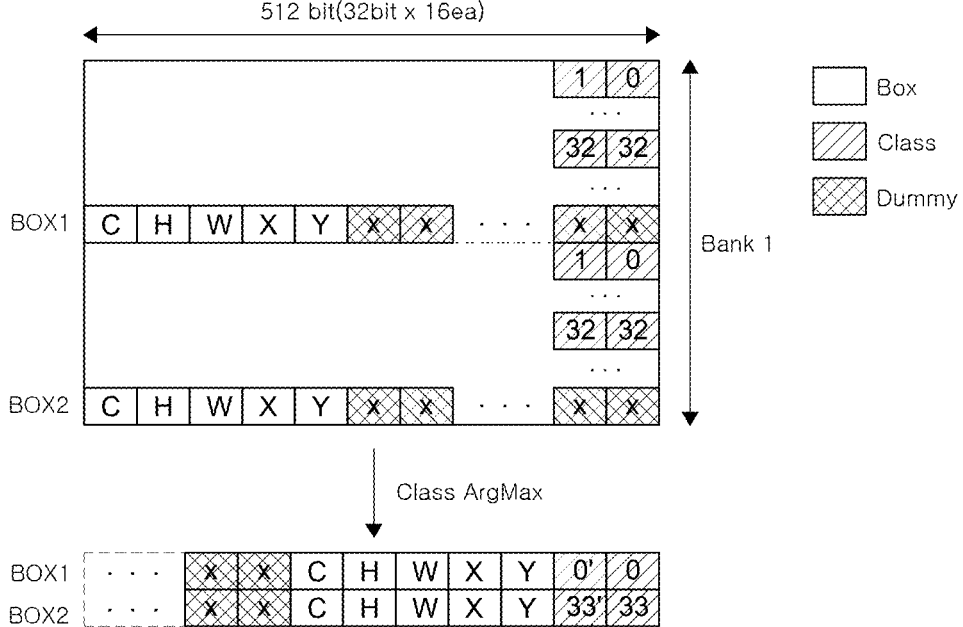
FIG. 23 is a diagram illustrating a class argmax computation step performed by a post-processing unit, according to one example of the present disclosure.

FIG. 23 is a diagram illustrating a class-argmax computation step 610 of FIG. 6 performed by the PPU, according to one example of the present disclosure. In the class-argmax operation step S120 of FIG. 6, the first computation unit 610 extracts the class with the highest class score from the plurality of classes included in a bounding box. That is, in the class-argmax operation step S120, the first computation unit 610 performs a class-argmax operation to extract the index of the class with the highest class score in the bounding box and its class score.

Specifically, within one memory bank of the internal memory 630, for each of the plurality of bounding boxes, an object presence confidence score of the bounding box, coordinate of the bounding box, and indices of the multiple classes corresponding to the objects contained in the bounding box, and the score of each class may be stored. Referring to FIG. 23, the memory bank Bank1 may include data for a plurality of bounding boxes. The memory bank Bank1 may include a part of DATA memory bank, a part of OUTPUT1 memory bank, and a part of OUTPUT2 memory bank, described above with reference to FIG. 5. For example, the memory bank Bank1 may include data for a first bounding box BOX1 and data for a second bounding box BOX2. Similarly, the memory bank Bank2, described below with reference to FIG. 30, may include another part of DATA memory bank, another part of OUTPUT1 memory bank and another part of OUTPUT2 memory bank.

It is assumed for the example of FIG. 23 that the shape of the bounding boxes are rectangles. The data for the first bounding box BOX1 may include an object presence confidence score C predicting an object presence in the first bounding box BOX1, and bounding box coordinate data for the first bounding box BOX1, such as height data H, width data W, x data X, and y data Y. x data X and y data Y indicate the x-coordinate and the y-coordinate of the first bounding box BOX1 in the image, respectively. Further, the data for the second bounding box BOX2 may also include an object presence confidence score C predicting an object presence for the second bounding box BOX2, and the second bounding box coordinate data: height data H, width data W, x data X, and y data Y. The memory bank Bank1 may also include a plurality of dummy data to fill in empty or unused bits in the word width.

The shape of the bounding box is not limited to a rectangle, but may be transformed into a pentagon, a polygonal shape or a circle. The number and type of bounding box coordinate data may vary according to the shape of the bounding box.

The data for the first bounding box BOX1 may include a plurality of class score data 0 to 33 for the objects included in the first bounding box BOX1. For example, an object included in the first bounding box BOX1 may be predicted to be one of several classes, and the data for first bounding box BOX1 may include class score data 0 to 33 of the predicted classes. Further, the data for the second bounding box BOX2 may also include a plurality of class score data 0 to 33 for the objects included in the second bounding box BOX2. For example, an object included in the second bounding box BOX2 may be predicted to be one of several classes, and the data for second bounding box BOX2 may include class score data 0 to 33 of the predicted classes.

Then, in the class-argmax operation step S120, the first computation unit 610 extracts the highest scoring class among the plurality of classes included in each bounding box. That is, in the class-argmax operation step S120, the first computation unit 610 performs a class-argmax operation to extract the index of the highest scoring class and its class score for the first bounding box BOX1 and those of the second bounding box BOX2. For example, the first computation unit 610 extracts, from the first bounding box BOX1, the first class index 0' and corresponding class score data 0, having the highest score among class score data 0 through 32 associated with the first bounding box BOX1. The first computation unit 610 also extracts, from the second bounding box BOX2, the last class index 33' and corresponding class score data 33, which is the highest class score among the class score data 0 through 33 associated with the second bounding box BOX2. The class index and class score data along with the bounding box coordinate data may be stored in memory bank Bank1. By extracting only the index data and the corresponding score data of one class from each of the bounding boxes BOX1, BOX2 and using or sending the extracted index data and its score data, the first computation unit 610 can reduce the size of data of each bounding box used or sent for subsequent processing. After storing the extracted data to memory bank Bank 1, the remaining data in memory bank Bank 1 is deleted or overwritten by other data and the data in memory bank Bank 1 is subject to subsequent processing. That is, after the extracted data is stored in the memory bank Bank 1, the remaining data in the memory bank Bank 1 is not used. The extracted data in memory bank Bank 1 becomes the target of subsequent processing. In this way, the more efficient use of data space available in internal memory 630 is enabled. Alternatively, instead of moving the bounding box coordinate data, and the extracted class index and class score data to memory bank Bank 1, the memory locations of the bounding box coordinate data, and the extracted class index and class score data may be stored in memory bank Bank 1, which may be later referenced by subsequent processes.

Figure 24:
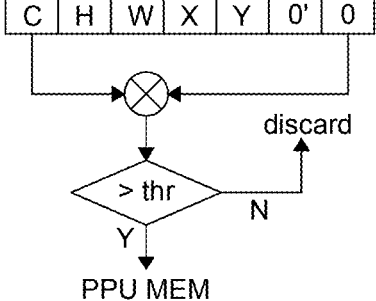
FIG. 24 is a diagram illustrating a filtering computation step performed by a post-processing unit, according to one example of the present disclosure.
Figure 25:
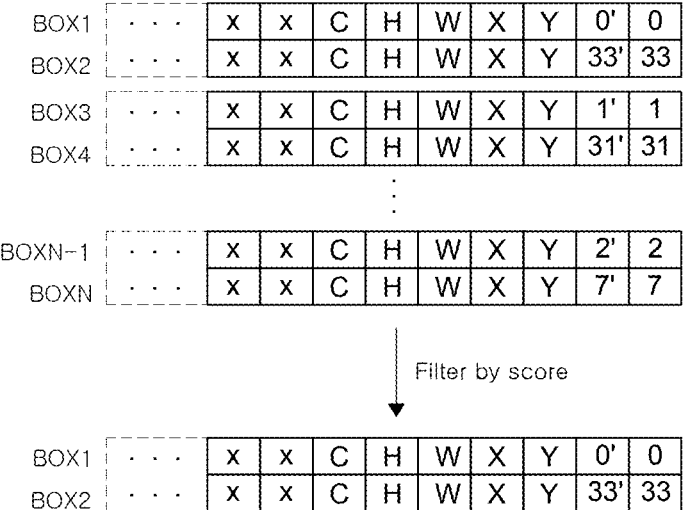
FIG. 25 is a diagram illustrating the result of a filtering operation performed by the post-processing unit, according to one example of the present disclosure.

FIG. 24 is a diagram illustrating a filtering computation step performed by the second computation unit 620 of the PPU on the bounding box BOX1, according to one example of the present disclosure. The process of FIG. 24 is repeated for other bounding boxes as well. FIG. 25 is a diagram illustrating the result of a filtering operation performed by the PPU according to one example of the present disclosure. In the filtering operation step S130, the second computation unit 620 extracts only the bounding boxes having a class confidence score above a threshold confidence score from the plurality of bounding boxes. The class confidence score may correspond to a product of an object presence confidence score C of the bounding box and a class score data extracted from the first computation unit 610. In the example described above with reference to FIG. 23, the class confidence score for BOX1 would be the product of object present score C of BOX1 and class score data 0 of BOX1 while the class confidence score for BOX2 would be the product of object present score C of BOX2 and class score data 33 of BOX2. In the filtering operation step S130, the second computation unit 620 extracts only those bounding boxes whose product of object presence confidence scores C of the bounding boxes and the class score data extracted from the first computation unit 610 are above a certain threshold confidence score thr. The information on the extracted or filtered bounding boxes are then stored in memory bank Bank 1 of the internal memory 630. The information on the extracted or filtered bounding boxes may include the bounding box coordinate data, the class index and the class score. Alternatively, memory bank Bank 1 may store the memory locations of the bounding box coordinate data, and the extracted class index and class score data of the filtered for further processing. In the filtering operation step S130, the second computation unit 620 does not store in memory bank Bank 1 the data for the bounding boxes whose product of the object presence confidence score C of the bounding box and the class score 0 extracted from the first computation unit 610 is less than or equal to the certain threshold confidence score thr. Only the data of the filtered bounding boxes may be subject to further processing. In this way, the amount of processing for the subsequent processing may be reduced.

In FIG. 25, it is assumed that there are N number of bounding boxes that have completed the class-argmax operation in the first computation unit 610. Accordingly, in the filtering operation step S130, the second computation unit 620 may extract only two bounding boxes among the N bounding boxes whose product of the object presence confidence score C and the class score data extracted from the first computation unit 610 is greater than a certain threshold confidence score thr. Only the data for the two filtered bounding boxes are subsequently processed by the internal processing unit. Accordingly, the size of data to be processed by the internal processing unit 640 may be reduced, allowing the internal processing unit 640 to perform operations at a faster speed using smaller memory. Thus, the performance of the PPU may be improved because it depends on the computation speed of the internal processing unit 640.

Figure 26:
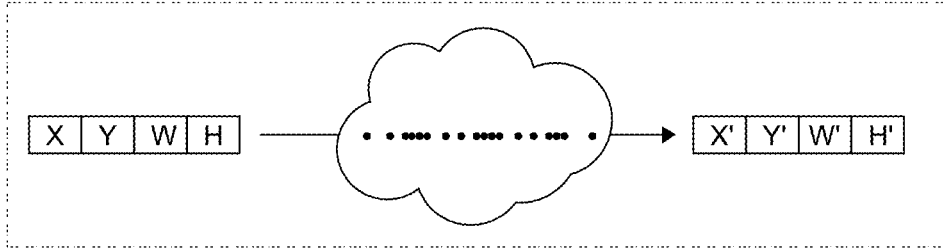
FIG. 26 is a diagram illustrating a decoding step performed by a post-processing unit, according to one example of the present disclosure.

FIG. 26 is a diagram illustrating a decoding step performed by a PPU, according to one example of the present disclosure. In a subsequent decoding step S140 of FIG. 6, the internal processing unit 640 may decode the data in the filtered bounding boxes. Specifically, referring to FIG. 26, the bounding box coordinate data is decoded so that it can be processed in the non-maximum suppression (NMS) operation step S150 of FIG. 6 that is subsequently performed by multiplication, addition, and subtraction operations of the height data H, width data W, x data X, and y data Y corresponding to the bounding box.

Figure 27:
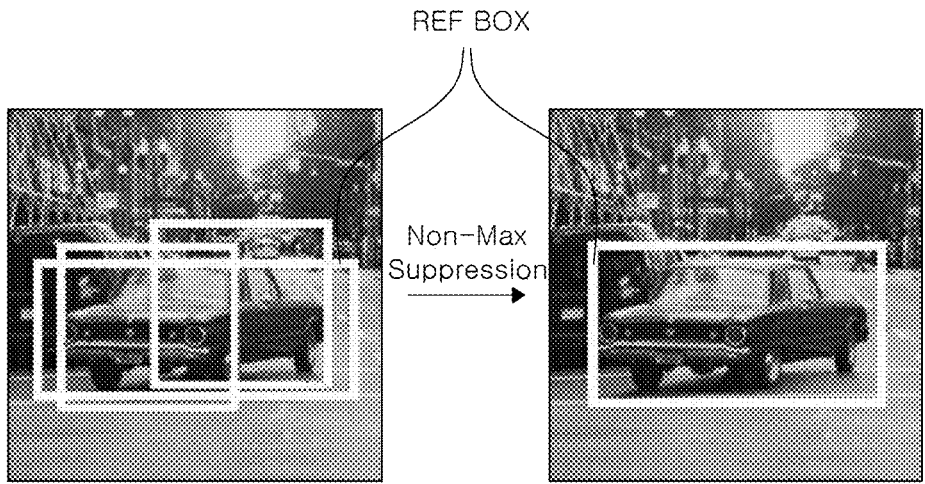
FIG. 27 is a diagram illustrating a non-maximum suppression (NMS) operation step performed by a post-processing unit, according to one example of the present disclosure.

FIG. 27 is a diagram illustrating an NMS operation step performed by the PPU, according to one example of the present disclosure. Subsequently, in the NMS computation step S150, the redundant or overlapping bounding boxes generated by the second computation unit 620 may be removed. The NMS refers to a post-processing step used in object detection tasks to remove redundant or overlapping bounding boxes generated by object detection algorithms, typically in neural network models such as You Only Look Once (YOLO) or Faster R-CNN. Through the NMS computation step, duplicative bounding boxes may be removed and only non-duplicate bounding boxes can be retained for further processing.

The NMS computation step can be broken down to include a confidence score sorting step and a deduplication step. First, in the confidence score sorting step, the bounding box data is sorted based on the confidence score, which is the product of the object presence confidence score of the bounding box and the class score. In one embodiment, the data of the bounding boxes with the highest confidence score is sorted first, and the remaining bounding boxes are sorted in a descending order of the confidence score.

In the deduplication step, the bounding box with the highest confidence score is used as the reference, and the degree of overlap between the bounding box with the highest confidence score and other bounding boxes is determined. The degree of overlap between a bounding box (REF BOX) having the highest confidence score and another bounding box is typically measured using the Intersection over Union (IoU), which is the ratio of the overlap and union area between two bounding boxes. If the IoU between the bounding box (REF BOX) with the highest confidence score and the other bounding box exceeds a predefined threshold (for example, 0.5 or more), this indicates that there is significant overlap between the two boxes, and thus the other bounding box is removed. The removal of the other bounding box is performed by deleting the data associated with the other bounding box from internal memory 630 or making space of internal memory 630 occupied by the data available for overwriting by other data. If the IoU between the bounding box (REF BOX) with the highest confidence score and the other bounding boxes is equal to or below a predefined threshold (for example, 0.5 or more), the other bounding box is retained. Through the non-maximum suppression (NMS) computation step, redundant bounding boxes can be removed from internal memory 630 and non-redundant bounding boxes can be retained, thereby improving the accuracy and reliability of the object detection system.

Figure 28:
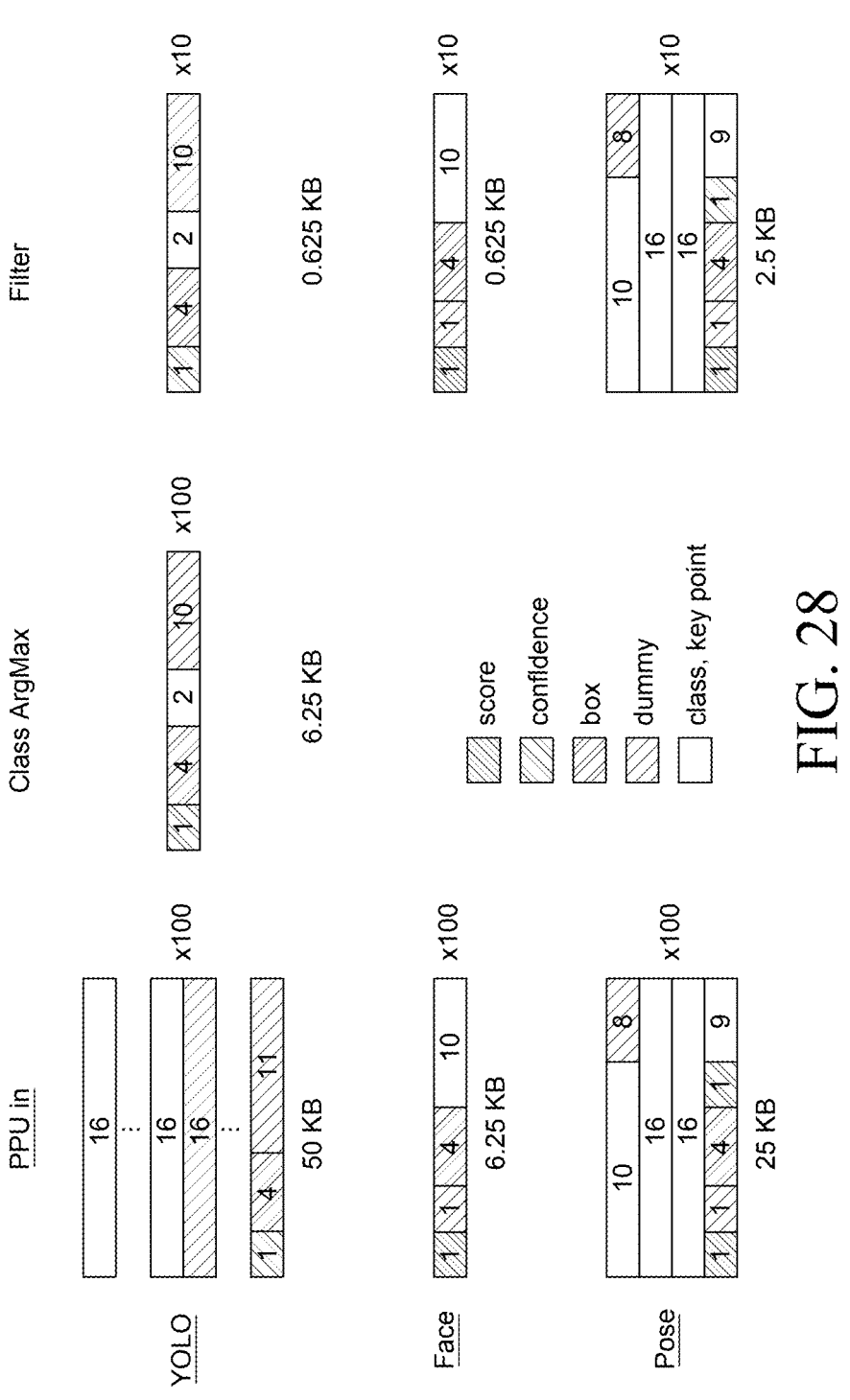
FIG. 28 is a diagram illustrating a data reduction amount of a neural processing unit including a post-processing unit, according to one example of the present disclosure.

FIG. 28 is a diagram illustrating the amount of data reduced in a neural processing unit including the PPU, according to one example of the present disclosure. In FIG. 8, data fields and their sizes for a single bounding box in the neural network models of YOLO, face and pose, the overall size of the data for the neural network models, and the reduction of the size of the data after performing filtering operation or a class-argmax operation in combination with the filtering operation are illustrated.

Taking the top example of using the neural network model of YOLO, the PPU may be input with 50 KB of data for each of the 100 bounding boxes, including an object presence confidence score and an index of a plurality of classes and a class score for the object contained inside the bounding box.

Then, in the class-argmax operation step, the first computation unit 610 performs a class-argmax operation to extract the index of the highest scoring class and the class score for each of the 100 bounding boxes, thereby reducing the plurality of class data (class, key point) to two. As a result, the size of the data is reduced from 50 KB to 6.25 KB. In the filtering operation step, the second computation unit 620 may filter the number of bounding boxes from 100 to 10 by removing the bounding boxes whose product of the object presence confidence score of the bounding box and the class score extracted from the first computation unit 610 is below a certain threshold confidence score thr, thereby reducing the size of the data from 6.25 KB to 0.625 KB.

In the next example where the neural network model is a face recognition model Face, in the filtering operation step, the second computation unit 620 may filter the number of bounding boxes from 100 to 10 by removing bounding boxes having a confidence score below a certain threshold confidence score thr, thereby reducing the size of the data from 6.25 KB to 0.625 KB. In this example, there is no separate reduction performed by a class-argmax operation.

In the bottom example, the neural network model is a pose detection model Pose. In the filtering operation step, the second computation unit 620 may filter the number of bounding boxes from 100 to 10 by removing the bounding boxes in which the product of the object presence confidence score and the class score is below a certain threshold confidence score (thr), thereby reducing the size of the data from 25 KB to 2.5 KB. In this example, there is also no separate reduction performed by a class-argmax operation.

Figure 29A:
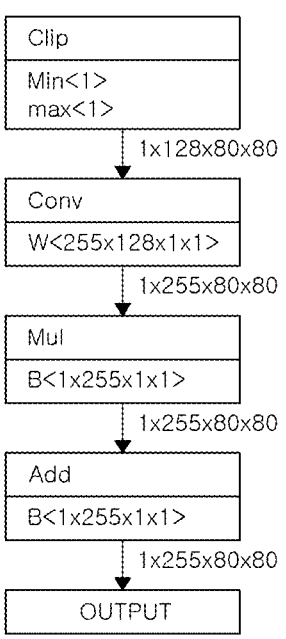
FIG. 29A is a diagram of a directed acyclic graph (DAG) representation of an object detection neural network model input to a neural processing unit including a post-processing unit, according to one example of the present disclosure.
Figure 29B:
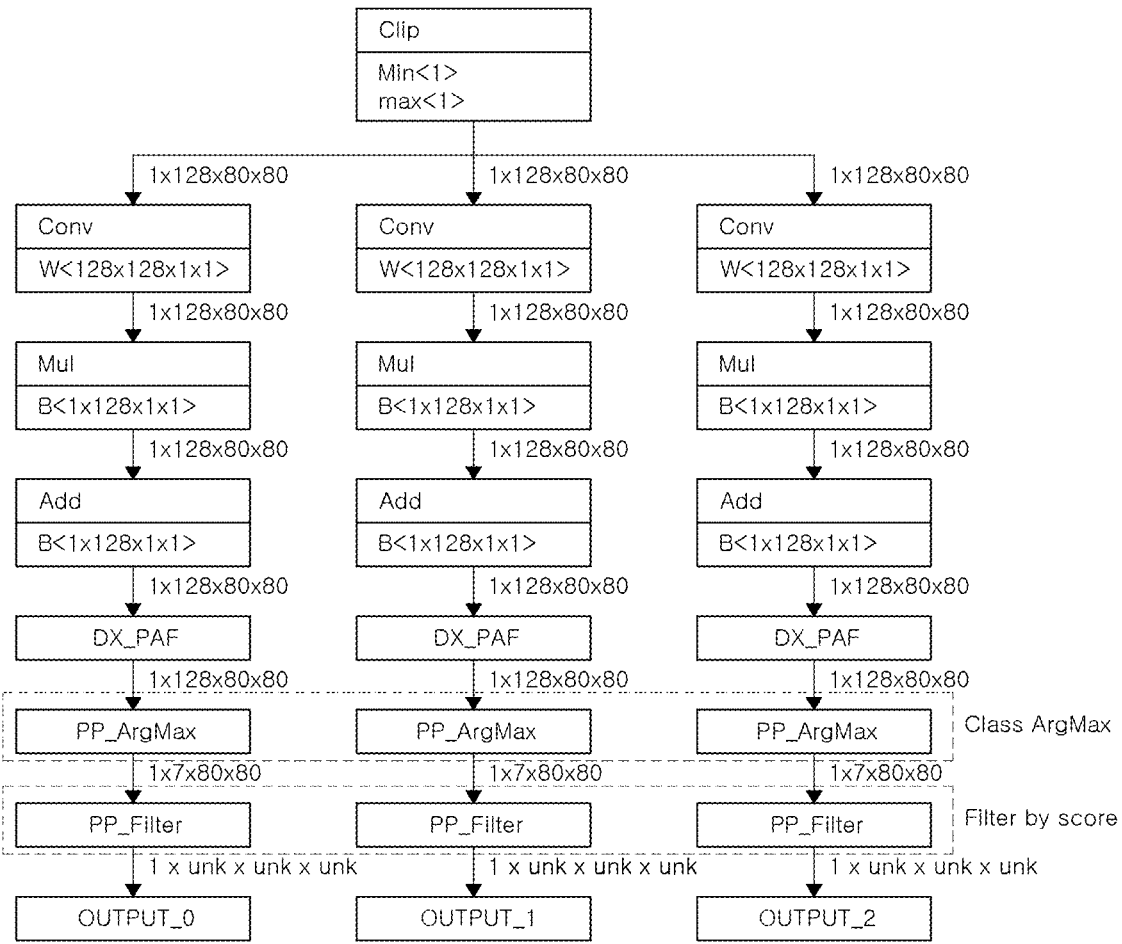
FIG. 29B is a DAG representation of an object detection neural network model that is post-processed in a neural processing unit including a post-processing unit, according to one example of the present disclosure.

FIG. 29A is a diagram of a directed acyclic graph (DAG) representation of an object detection neural network model input to a neural processing unit including a PPU, according to one example of the present disclosure. FIG. 29B is a diagram of a directed acyclic graph (DAG) representation of an object detection neural network model that is post-processed in a neural processing unit including a PPU, according to one example of the present disclosure.

An object recognition neural network model represented by a DAG can be composed of multiple layers and nodes connected to the multiple layers. As illustrated in FIG. 29A, the object detection neural network model may include a convolutional layer Conv, a multiplication layer Mul, and an addition layer Add operations. Specifically, the output of the convolutional layer Conv may be 255 channels of 80×80 bounding box data, the output of the multiplication layer Mul may be 255 channels of 80×80 bounding box data, and the output of the addition layer Add may be 255 channels of 80×80 bounding box data.

As shown in FIG. 29B, when the PPU 600 is applied according to one example of the present disclosure, the object detection neural network model may include a convolutional layer Conv, a multiplication layer Mul, and an addition layer Add, and may further include a programmed activation function layer DX_PAF, a class argmax layer PP_Argmax, and a filter layer PP_Filter. That is, in a neural processing unit including the PPU 600 according to one example of the present disclosure, the compiler may modify the object detection neural network model shown in FIG. 29A to further include a programmed activation function layer (DX_PAF), a class argmax layer (PP_Argmax), and a filter layer (PP_Filter) shown in FIG. 29B. The compiler may modify or improve the neural network model according to hardware information of the neural processing unit 1000 (e.g., the presence of the PPU 600 or the presence of the SFU 500, and the like) to use dedicated circuitry (e.g., the PPU or SFU) provided in the neural processing unit 1000 for accelerated computation on the neural processing unit 1000.

In FIG. 29B, for example, the number of types of anchor boxes of bounding boxes is three, so three convolution layers Conv, three multiplication layers Mul, three addition layers Add, three programmed activation function layers DX_PAF, three class argmax layers PP_Argmax, and three filter layers PP_Filter are shown. The An anchor box is a predefined bounding box used in object detection to generate candidate regions of various sizes and aspect ratios for identifying objects at specific locations. The number of each layer may vary according to the number of types of anchor boxes of bounding boxes.

In FIG. 29B, the output of the convolutional layer Conv may be 128 channels of 80×80 bounding box data, the output of the multiplication layer Mul may be 128 channels of 80×80 bounding box data, and the output of the addition layer Add may be 128 channels of 80×80 bounding box data. However, as described above, the size of the bounding box data output from the class-argmax layer PP_Argmax is reduced so that seven channels of 80×80 bounding box data including the object presence confidence score, bounding box coordinate data, and class data that predicted the object presence is retained in internal memory 630 while removing others are discarded from internal memory 630.

Then, by processing in the filter layer PP_Filter, only the bounding box data whose class confidence score is above the threshold confidence score among the 80×80 bounding box data of 7 channels can be retained in internal memory 630 and the remaining data may be discarded from internal memory 630.

Figure 30:
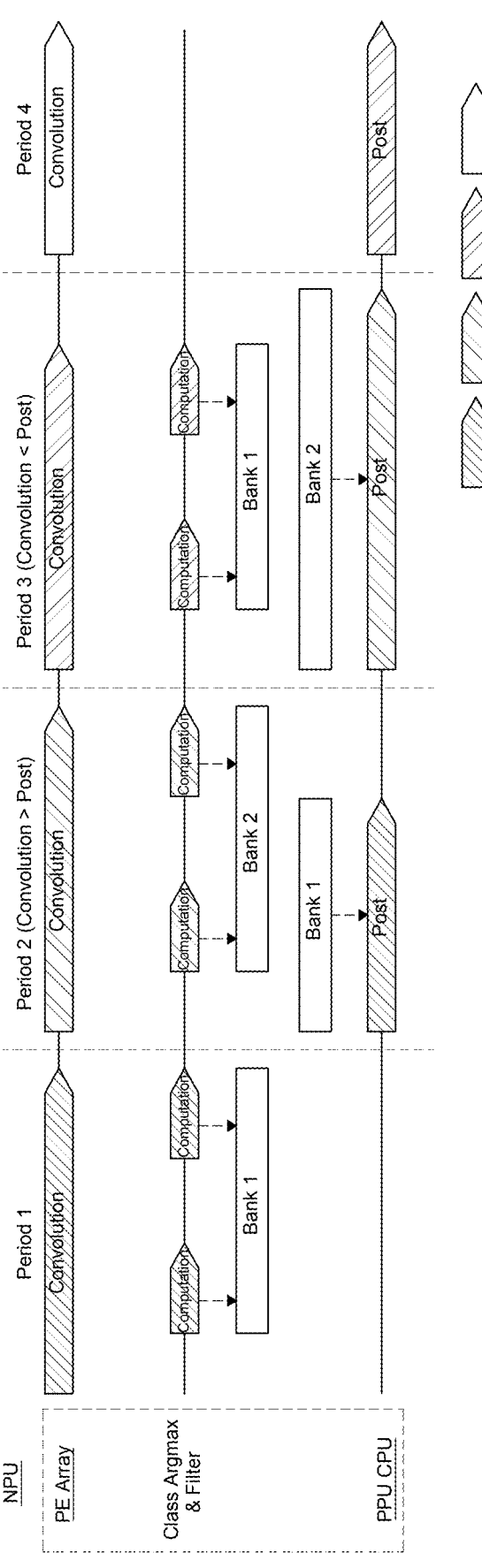
FIG. 30 is a timing diagram illustrating a plurality of image data computation processes of a neural processing unit including a post-processing unit according to one example of the present disclosure.

FIG. 30 is a timing diagram illustrating a plurality of image data computation processes of a neural processing unit including a PPU, according to one example of the present disclosure. FIG. 30 illustrates a process of computing a plurality of image data in a neural processing unit including a PPU 600, divided into a first period Period1 in which a first image data IMG1 is received by the neural processing unit, a second period Period2 in which a second image data IMG2 is received by the neural processing unit, a third period Period3 in which a third image data IMG3 is received by the neural processing unit, and a fourth period Period4 in which a fourth image data IMG4 is received by the neural processing unit.

In Period1 of FIG. 30, the PE array performs convolution operations on the first image data IMG1 to output data for a plurality of bounding boxes for the first image data IMG1. While the PE array performs the convolution operation, the first computation unit 610 performs a class-argmax operation on the outputted plurality of bounding box data, and the second computation unit 620 performs a filtering operation on the bounding box data. In FIG. 30, "computation" means the class-argmax operation and filtering operation. The data of the bounding boxes in the first image data IMG1, which is the output of the first computation unit 610 and the second computation unit 620, may be stored in the first memory bank Bank 1 of the internal memory 630.

Period2 begins after the PE array finishes performing the convolution operations on the first image data IMG1. In Period2, the PE array performs convolution operations on the second image data IMG2 to output data on a plurality of bounding boxes in the second image data IMG2. While the PE array performs the convolution operation, the first computation unit 610 performs a class-argmax operation on the outputted plurality of bounding box data, and the second computation unit 620 performs a filtering operation on the bounding box data. The data of the bounding boxes in the second image data IMG2, which is the output of the first computation unit 610 and the second computation unit 620, may be stored in the second memory bank Bank2 of the internal memory 630. Meanwhile, the internal processing unit 640 performs decoding and NMS operations Post on the data of the bounding boxes of the first image data IMG1, which is the previous image data received from the first memory bank Bank1. In Period2, because the convolution operation time of the PE array takes longer than the decoding and NMS operation time of the internal processing unit 640, Period3 begins after the PE array finishes convolution operations on the second image data IMG2.

In Period3 of FIG. 30, the PE array performs convolution operations on the third image data IMG3 to output data on a plurality of bounding boxes in the third image data IMG3. While the PE array performs the convolution operations, the first computation unit 610 performs a class-argmax operation on the outputted plurality of bounding box data, and the second computation unit 620 performs a filtering operation on the bounding box data.

Then, the data of the bounding boxes in the third image data IMG3, which is the output of the first computation unit 610 and the second computation unit 620, may be stored in the first memory bank Bank1 of the internal memory 630.

Meanwhile, in Period3 of FIG. 30, while the PE array performs the convolution operations, the internal computation unit 640 performs decoding and NMS operations Post on the data of the bounding boxes of the second image data IMG2 input from the second memory bank Bank2. Because the decoding and NMS the operation time for the internal processing unit 640 take longer than the convolution time of the PE array in Period3, Period4 begins after the internal processing unit 640 finishes decoding and NMS operations on the data in the bounding boxes of the second image data IMG2.

In Period4, the PE array performs convolution operations on the fourth image data IMG4, outputting data on multiple bounding boxes in the fourth image data IMG4, identical to the sequence of operations described in Period2. While the PE array performs the convolution operations, the first computation unit 610 performs a class-argmax operation (shown as "c–a" in FIG. 30) on the outputted plurality of bounding box data, and the second computation unit 620 performs a filtering operation (shown as "filter" in FIG. 30). Further, while the PE array performs the convolution operations, the internal computation unit 640 performs decoding and NMS operations Post on the data of the bounding boxes of the third image data IMG3.

Again, at the later of the time when the internal processing unit 640 finishes performing the non-maximum suppression (NMS) operation on the first image data IMG1 and the time when the PE array finishes performing the operation on the second image data IMG2, the PE array starts performing the operation on the third image data, or the internal processing unit 640 performs the decoding and NMS operation Post on the data in the bounding boxes of the second image data IMG2.

As described above, the neural processing unit including the PPU according to the present disclosure may perform a class-argmax operation by the first computation unit 610 and a filtering operation by the second computation unit 620 on the outputted plurality of bounding box data while the PE array performs a convolution operation. Accordingly, the neural processing unit including the PPU according to the present disclosure may reduce the processing time of the post-processing operation because the time for the class-argmax operation and the filtering operation, which are part of the post-processing operation, is not required separately. In other words, a neural processing unit comprising a PPU according to the present disclosure will only need time separately for the decoding and NMS operations, which are different parts of the post-processing operation, and will not need time separately for the class-argmax operation and the filtering operation, which are different parts of the post-processing operation.

Specifically, if the post-processing operation including a class-argmax operation, a filtering operation, a decoding operation, and an NMS operation are all performed, the size of the data that the post-processing operation processes may be 8.2 MB, and the data processing time may be 24 ms. On the other hand, if only decoding and NMS operations are performed during the post-processing operation, the size of the data that the post-processing operation processes may be 128 KB, and the data processing time may be 1.29 ms.

The neural processing unit including the PPU according to the present disclosure has the benefit of the first computation unit 610 performing a class-argmax operation on the outputted data of a plurality of bounding boxes and the second computation unit 620 performing a filtering operation while the PE array performs convolution operations, so that the additional time required for the post-processing operation and the amount of data to be processed may be reduced. Thus, it has the advantage of, among others, improving the computation speed of the neural processing unit including the PPU according to the present disclosure.

Furthermore, while the PE array performs the convolution operation, the internal processing unit 640 may perform decoding and NMS operations on the data of the bounding boxes of the previous image data. As a result, the decoding and NMS operations during the post-processing operation of the previous image data may overlap with the convolution operation time of the subsequent image data, which has the advantage that the computation speed of the neural processing unit may be further improved.

The neural processing unit according to the present disclosure may include a PPU comprising an internal memory and an internal processing unit. Accordingly, it beneficially eliminates or reduces the transfer data to an external memory and an external processing unit for post-processing operations, such as the class-argmax operation, the filtering operation, the decoding operation, and the NMS operation. Accordingly, the neural processing unit according to the present disclosure does not need to transmit data from an external device for the post-processing operations, and thus, no data delay due to the bus transmission is generated. As a result, the computation speed of the neural processing unit according to the present disclosure can be further improved, and the power consumption for data transmission from an external device can also be minimized, which has the effect of enabling low-power operation.

According to an example of the present disclosure, a neural processing unit may be provided.

The neural processing unit may comprise a PE array configured to perform operations of a neural network model and a PPU configured to process data output from the PE array.

The neural processing unit may comprise a SFU configured to perform activation function operations on the data output from the PE array.

The neural network model may be an object detection model, the data output from the PE array may include data of a plurality of bounding boxes for image data, and each of the data of the plurality of bounding boxes may include an object presence confidence score, bounding box coordinate data, and class data.

The PPU may include a first computation unit configured to extract a highest-scoring class of a plurality of classes included in each of a plurality of bounding boxes, and a second computation unit configured to extract one or more bounding boxes from the plurality of bounding boxes that have a class confidence score equal to or greater than a threshold confidence score. The class confidence score may be a product of an object presence confidence score of the bounding box and a class score extracted by the first computation unit.

The PPU may include a first computation unit configured to perform a class-argmax operation that extracts an index of a class having a highest score and a class score thereof for a plurality of bounding boxes, and a second computation unit configured to perform a bounding box filtering operation configured to extract one or more bounding boxes having a product of an object presence confidence score of the bounding box and a class score extracted from the first computation unit, equal to or greater than a threshold confidence score.

The PPU may include an internal memory configured to store the data output from the first computation unit and the second computation unit.

The internal memory may include a plurality of memory banks, a portion of the plurality of memory banks may be configured to store output data of the first computation unit, and another portion of the plurality of memory banks may be configured to store output data of the second computation unit.

While the PE array is performing an operation, the first computation unit may perform the class-argmax operation, and the second computation unit may perform the bounding box filtering operation.

The PPU may include an internal processing unit configured to perform an NMS operation for a plurality of extracted bounding boxes, and through the NMS operation, redundant bounding boxes among the plurality of extracted bounding boxes may be removed.

While the PE array performs an operation on subsequent image data, the internal processing unit may perform the NMS operation on previous image data.

The internal processing unit may be configured to start the NMS operation for subsequent image data from the later of a completion time of the internal processing unit processing the NMS operation for previous image data and a completion time of the PE array processing the subsequent image data following the previous image data.

The PE array may be configured to start an operation for third image data from the later of a completion time of the internal processing unit processing the NMS operation for first image data and a completion time of the PE array processing second image data following the first image data.

The neural processing unit may comprise a compiler configured to add a class-argmax layer and a filtering layer to an input neural network model.

The examples of the present disclosure disclosed herein and in the drawings are provided solely to explain the technical content of the present disclosure and to facilitate understanding of the present disclosure, and are not intended to limit the scope of the present disclosure. It will be apparent to one of ordinary skill in the art to which present disclosure belongs that other modifications based on the technical ideas of the invention may be practiced in addition to the examples shown herein.

[National R&D Project Supporting this Invention]
    [Task Identification Number] 1711193211
    [Task Number] 2022-0-00957-002
    [Name of Ministry] Ministry of Science and ICT
    [Name of Project Management (Specialized) Institution]
        Institute of Information & communications Technology
        Planning & Evaluation

[Research Project Title] Development of PIM Core Technology for Artificial Intelligence Semiconductor (Design)
[Research Task Title] Development of Distributed On-Chip Memory-Operator Convergence PIM Semiconductor Technology for Edge
[Contribution Rate] 1/1
[Name of Organization Performing the Task] DEEPX CO., LTD.
[Research period] 2023 Jan. 1~2023 Dec. 31

What is claimed is:

1. A neural processing circuit comprising:
a processing element array circuit comprising a plurality of processing element circuits each configured to perform multiply and accumulate operations as a part of mathematical operations of a neural network model on an image, the processing element array circuit configured to generate a plurality of bounding boxes and class scores as data output, the class scores indicative of probability that classes of objects are present in each of the bounding boxes; and
a post-processing circuit coupled to the processing element array circuit to receive the data output, the post-processing circuit configured to extract a subset of the data output, the post-processing circuit comprising:
    a first computation circuit configured to:
        compare the class scores for each of the bounding boxes, and
        select one or more classes of highest class scores for each of the bounding boxes as the subset of the data output based on the comparison of the class scores;
    an internal memory configured to selectively store the extracted subset of the data output without storing classes other than the highest class scores; and
    an internal processing circuit coupled to the internal memory and configured to perform a non-maximum suppression (NMS) operation on one or more bounding boxes derived from the extracted subset of the data output in response to selectively storing the extracted subset of the data output in the internal memory,
wherein in a first period:
    the processing element array circuit generates the data output from the image,
    the post-processing circuit selects the one or more classes derived from the image, and
    the internal memory selectively stores the extracted subset of the data output; and
wherein in a second period subsequent to the first period:
    the processing element array circuit generates subsequent data output from a subsequent image following the image, and
    the post-processing circuit selects one or more classes derived from the subsequent image, and performs the NMS operation on the one or more bounding boxes derived from the extracted subset of the data output stored in the internal memory in the first period.

2. The neural processing circuit of claim 1, wherein the post-processing circuit further comprises:
a second computation circuit configured to extract the one or more bounding boxes by comparing a class confidence score of each of the bounding boxes with a threshold confidence score, the class confidence score representing probability that an object of a class is present in each of the bounding boxes and derived from an object presence confidence score and the class scores, the object presence confidence score included in the data output and indicative of probability that an object is present in each of the bounding boxes.

3. The neural processing circuit of claim 2, wherein the second computation circuit is configured to compute the class confidence score as a product of the object presence confidence score and a class score with the subset of classes extracted by the first computation circuit.

4. The neural processing circuit of claim 1, wherein the internal processing circuit performs at least part of the NMS operation while the processing element array performs at least part of the mathematical operations.

5. The neural processing circuit of claim 4, wherein the internal processing circuit is configured to start the NMS operation for a subsequent image subsequent to the image at a time that is later of (i) a completion time of the NMS operation for the image data and (ii) a completion time of the mathematical operations on the image by the processing element array circuit.

6. The neural processing circuit of claim 1, wherein the data output further includes coordinate data of each of the bounding boxes.

7. The neural processing circuit of claim 1, wherein the first computation circuit performs the comparison of the class scores while the processing element array circuit performs the mathematical operations.

8. The neural processing circuit of claim 1, further comprising:
   one or more processors; and
   memory storing instructions of a compiler, the instructions when executed by the one or more processors cause the one or more processors to add a class-argmax layer to generate the neural network model, and
   wherein the extracting of the subset of classes by the first computation circuit corresponds to operations of the class-argmax layer.

9. A method comprising:
   generating, by a plurality of processing element circuits in a processing array circuit of a neural processing circuit, a plurality of bounding boxes and class scores as data output by performing multiply and accumulate operations as part of mathematical operations of a neural network model on an image, the class scores indicative of probability that classes of objects are present in each of the bounding boxes;
   receiving the generated data output by a post-processing circuit of the neural processing circuit;
   comparing the class scores of each of the bounding boxes by a first computation circuit of the post-processing circuit,
   selecting one or more classes of highest class scores for each of the bounding boxes as a subset of the data output by the first computation circuit of the post-processing circuit;
   selectively storing the subset of the data output in an internal memory of the post-processing circuit without storing classes other than the highest class scores; and
   performing a non-maximum suppression (NMS) operation on one or more bounding boxes derived from the selected subset of the data output in response to selectively storing the subset of the data output in the internal memory,
   wherein in a first period:
      generating the data output from the image by the processing element array circuit,
      selecting the one or more classes derived from the image by the post-processing circuit, and selectively storing the extracted subset of the data output by the internal memory; and
   wherein in a second period subsequent to the first period:
      generating subsequent data output from a subsequent image following the image by the processing element array circuit, and
      selecting one or more classes derived from the subsequent image, and performing the NMS operation on the one or more bounding boxes derived from the extracted subset of the data output stored in the internal memory in the first period by the post-processing circuit.

10. The method of claim 9, further comprising
    extracting the one or more of the bounding boxes at a second computation circuit of the neural processing circuit by comparing a class confidence score of each of the bounding boxes with a threshold confidence score, the class confidence score representing probability that an object of a class is present in each of the bounding boxes and derived from an object presence confidence score and the class scores, the object presence confidence score included in the data output and indicative of probability that an object is present in each of the bounding boxes.

11. The method of claim 10, wherein the class confidence score is determined as a product of the object presence confidence score and a class score extracted by the first computation circuit.

12. The method of claim 9, wherein at least part of the NMS operation is performed by the internal processing circuit simultaneously with performing of at least part of the mathematical operations by the processing element array.

13. A neural processing circuit comprising:
    a processing element array circuit configured to generate data output by performing mathematical operations of a neural network model to detect objects in an image, the data output including, for each bounding box in a region of the image:
       an object presence confidence score indicative of probability that an object is present in each bounding box, and
       class scores indicative of probability that classes of objects being present in each bounding box; and
    a computation circuit coupled to the processing element array circuit, the computation circuit configured to:
       extract one or more bounding boxes as data output by comparing a class confidence score of each bounding box with a threshold confidence score, the class confidence score representing probability that an object of a class is present in each bounding box, the class confidence score derived from the object presence confidence score and the class scores, and
       selectively store the extracted one or more bounding boxes in an internal memory without storing classes other than the highest class scores for subsequently performing a non-maximum suppression (NMS) operation on the extracted one or more bounding boxes,
    wherein in a first period:
       the processing element array circuit generates the data output from the image,
       the computation circuit extracts the one or more bounding boxes derived from the image, and the computation circuit selectively stores the extracted one or more bounding boxes in the internal memory; and wherein in a second period subsequent to the first period:

the processing element array circuit generates subsequent data output from a subsequent image following the image, and the computation circuit extracts one or more bounding boxes derived from the subsequent image, and performs the NMS operation on the extracted one or more bounding boxes stored in the first period.

\* \* \* \* \*